United States Patent [19]

Mesenich

[11] Patent Number: 4,979,542

[45] Date of Patent: Dec. 25, 1990

[54] PULSE MODULATED HYDRAULIC VALVE

[75] Inventor: Gerhard Mesenich, Bochum, Fed. Rep. of Germany

[73] Assignee: Siemens Automotive L.P., Troy, Mich.

[21] Appl. No.: 341,576

[22] Filed: Apr. 20, 1989

[30] Foreign Application Priority Data

Apr. 27, 1988 [DE] Fed. Rep. of Germany ....... 3814156

[51] Int. Cl.⁵ ............................................ F15B 13/044
[52] U.S. Cl. ............................ 137/625.65; 137/625.27
[58] Field of Search ......................... 137/625.27, 625.65

[56] References Cited

U.S. PATENT DOCUMENTS

| | | |
|---|---|---|
| 3,178,151 | 4/1965 | Caldwell . |
| 3,285,285 | 11/1966 | Bielefeld . |
| 3,383,084 | 5/1968 | Mayfield . |
| 3,538,954 | 11/1970 | Fagerlie et al. . |
| 3,548,877 | 12/1970 | Aumayer . |
| 3,633,139 | 1/1972 | Thompson . |
| 3,637,264 | 1/1972 | Leiber et al. . |
| 3,704,727 | 12/1972 | Adahan ................. 137/625.65 |
| 4,354,525 | 10/1982 | Oyama et al. . |
| 4,442,998 | 4/1984 | Ohyama et al. . |
| 4,513,780 | 4/1985 | Evans ..................... 137/625.65 |
| 4,531,708 | 7/1985 | Livet . |
| 4,538,645 | 9/1985 | Perach ................... 137/625.65 |
| 4,582,294 | 4/1986 | Fargo . |
| 4,595,170 | 6/1986 | Livet . |
| 4,611,631 | 9/1986 | Kosugi et al. . |
| 4,655,249 | 4/1987 | Livet . |
| 4,679,593 | 7/1987 | Sanders ................. 137/625.65 |
| 4,719,943 | 1/1988 | Perach ................... 137/625.65 |
| 4,741,365 | 5/1988 | Van Ornum ........... 137/625.65 |
| 4,749,892 | 6/1988 | Menenich . |
| 4,783,050 | 11/1988 | Hugler ................. 137/625.65 X |
| 4,783,051 | 11/1988 | Gibas . |
| 4,810,985 | 3/1989 | Mesenich . |
| 4,844,122 | 7/1989 | Ichihashi ............... 137/625.65 |
| 4,917,150 | 4/1990 | Koch et al. ............ 137/625.65 |

FOREIGN PATENT DOCUMENTS

| | | |
|---|---|---|
| 0012865 | 7/1980 | European Pat. Off. ....... 137/625.65 |
| 0135474 | 3/1985 | European Pat. Off. . |
| 3149916 | 7/1982 | Fed. Rep. of Germany . |
| 3141705 | 4/1983 | Fed. Rep. of Germany . |
| 2580366 | 10/1986 | France . |

OTHER PUBLICATIONS

Olhydraulik und Pneumatik, vol. 22, No. 11 (1978), pp. 647–652.

*Primary Examiner*—Gerald A. Michalsky
*Attorney, Agent, or Firm*—Russel C. Wells; George L. Boller

[57] ABSTRACT

A fast acting, electromagnetically actuated three-way miniature valve which is specifically useful for applications in automobile technology; for example, the electronically controlled pressure regulation in automatic transmissions. An example of the invention is characterized by the combination of: armature and obturator are a single solid unit, preferably manufactured out of one piece, and with a total mass of only a few grams; the valve stroke is significantly less than 0.5 mm, preferably 0.05–0.2 mm; the bearing arrangement for the valve obturator is such that a radial clearance of less than 0.05 mm is involved and the valve obturator is movable in the direction of the axis, and this bearing arrangement simultaneously guides the armature and also serves to separate two spaces of differing pressure; the valve obturator coordinates with two alternately closing valve seats; the seating surfaces of the armature, in both directions of movement, are exclusively defined by the valve obturator; the seating surfaces of the armature are perfused by the main oil stream prior to the armature reaching its final position; the valve seats feature approximately the same radius as the armature bearing, where the average radius of the valve seats does not deviate by more than $\pm -1$ mm from that of the armature bearing, and where this deviation of the radii of the valve seats preferably shall not exceed 0.4 mm.

9 Claims, 9 Drawing Sheets

PULSE MODULATED HYDRAULIC VALVE

BACKGROUND OF THE INVENTION

1. Field of the Invention

The subject of the invention is a fast acting electromagnetically actuated miniature valve which is specifically useful for applications in automobile technology. The valve is controlled by means of state of the art electronic circuitry with frequencies of up to several hundred Hertz using variable length drive pulses. It is suitable for pressure ranges up to approximately 200 bar. The cross-sectional area of flow is from 0.5 to 10 square millimeters. The principal application area is the electronically controlled pressure regulation in automatic transmissions. Additional application areas are to be found in such cases where especially high requirements exist for high speed switching action, repeat precision, and durability. Among these, the following applications are examples: pilot control of Diesel injection nozzles, power steering, automatic anti-skid systems, or electronic suspension tuning.

2. Problem Definition and State of the Art

In order to improve driving comfort and reduce energy consumption, the automotive industry is striving toward the electronic control of switching processes in automatic transmissions. This requires exact control of the pressure variables in the individual hydraulic modules of the transmission. The electronic valves required for controlling the pressure variables can be divided into two main categories: analog controlled valves and pulse modulated valves.

Analog controlled valves are set by changing the strength of the electrical current. The necessary control circuitry is relatively costly and complex. The magnetic circuitry of analog controlled valves can only exert small displacement forces. Even minor changes in the actuating force requirements can cause considerable deviations from the rated output of the valve. Therefore, these valves are sensitive to even the slightest tolerance changes. They are sensitive to changes in oil-throughput, viscosity, and contamination of the hydraulic oil. In addition, valves of this type exhibit a considerable hysteresis. Manufacture of such valves, as well as their calibration and the necessary quality control are costly and labor intensive. Despite the listed disadvantages, at present only the analogtype valves are capable of meeting the requirements of the automotive industry. Thus, to date, only analog valves have been adopted in mass production.

Because of the disadvantages detailed above for the analog-type valves, especially the American automotive industry is desirous of using pulse modulated valves. Such pulse modulated valves control the desired pressure variables by changing the control factors. To this effect the hydraulic load is alternately connected, by means of a three-way valve arrangement, with the pressurized oil source and an essentially unpressurized return oil stream. This effect is normally achieved at constant frequency, but at variable duty cycles of the electrical current. By means of the resulting pressure pulses, and given a high enough frequency of the events, the desired average pressure at the load section is achieved. This digital process offers considerable advantages, both with respect to energy consumption and controllability, over the conventional analog procedure.

In principle, such pulse modulated control devices have been known for some time. An introduction to this technology can, for instance, be found in the article published in 1972 by Hesse and Moeller (Pulse Duration Modulated Control of Magnetic Valves; Oelhydraulik und Pneumatic 16, specifically on page 451).

Despite the known advantages of pulse modulated pressure control, this technology has to date not found any entry into mass production. The reason for this is mainly found in the heretofore inadequate durability of the devices, and the often deficient speed of switching action of the valves which have been used in experimental trials. The special requirements of the pulse modulated operating procedure shall be detailed in the following.

Pulse modulated valves for pressure control in automatic transmissions are employed at frequencies of 30–100 Hz. This frequency range was found to be required in order to provide for adequate transition speed from one state to the next, and also to provide for adequate decoupling between valve and hydraulic load element. For automatic transmissions with pulse modulated control, two different types of design are in use: one type involves direct activation of the displacement cylinders by pulse modulated valves; the other type involves pilot control of the pressure level in the total hydraulic system and action on the cylinders by means of simple three-way valves. In the direct action mode the valve is only pulsed during the shifting action. The lifetime required for on-line control is in the order of $10^7$ cycles, and the necessary cross-sectional area of flow is 0.5–10 mm². In the pilot control design, the pulse modulated valve is in continuous use during drive operation. Because of the enormously high number of action cycles, the automotive industry in this case requires a lifetime guarantee of at least $10^9$ cycles. On the other hand, the pilot control design mode only requires a cross-sectional area of flow of approximately 1-2 mm.

It has been determined that for adequate reproducibility of the switching events for the intended application, pick-up and release times of less than 2 ms are necessary. These pick-up and release times should be achieved by means of the usual supply voltage of 12 V with maximum energizing currents of preferably less than 4 A, in addition these times should only vary insignificantly during actual use of the valve. To achieve such high-speed switching action is problematic, especially for direct on-line mode of operation, because of the relatively large cross-sectional flow requirements.

The general problems inherent in pulse modulated pressure control are further complicated in automotive applications by the special operating requirements. For these applications the valve has to operate reliably at temperatures as low as −40° C. By reliable operation is to be understood that the valve must be capable of opening and closing actions at this temperature. Maintenance of rated specifications is required down to −20° C. At −40° C. the hydraulic oil has turned into a viscous, jelly-like mass, which, for most conventional valve designs, no longer provides for adequate lubrication. In addition the hydraulic working oil will contain abraded ferritic magnetizable particles which in certain designs tend to deposit at the working gap of the electromagnet and thus degrade the capacity of the magnet.

In the case of pulse modulated three-way valves two different hydraulic connection methods are possible, one where the load element in the non-energized state of the electromagnet is either connected to the pressurized oil source, or with the virtually pressureless return oil flow. The connection method used depends on the valve position required in the case of operating trouble. Under practical conditions the required connection method is, however, almost always the one where the load element is connected to the pressurized oil source in the case of the non-energized state of the electromagnet. With this connection method, the reset position of the valve is obtained via the supply pressure. This makes it possible to omit the reset spring which is normally required. It is to be noted, however, that this involves a greater sensitivity of the rated capacity to variations in the supply pressure. For extreme precision requirements with respect to the rated capacity range, even for this connection method, it is better to provide for a reset spring.

With respect to manufacturing requirements the automotive industry also has special demands. It is a matter of course that a suitable valve must be at least equivalent in cost and capacity rating to a comparable valve of analog design. In addition, there are the requirements for very small dimensional parameters and adaptability to the existing hydraulic conduits, so that the valve can be fitted into the limited spaces of already existing automatic transmissions. The external dimensions of the valve should approximate those of the conventional low pressure injection valves. In addition, a series model should be adaptable to the previously detailed hydraulic connection methods, and the various applications as found in general automotive hydraulic applications. This allows for a larger volume of basic series production and simplifies production logistics. As a natural consequence, production- and quality control-costs are lowered.

In summation, a suitable valve for pulse modulated pressure control of automatic transmissions must live up to the following requirements:

virtually wear-resistant operation, lifetime up to $10^9$ cycles,
pick-up and release times preferably less than 2 ms, stable and reproducible performance,
control directly by means of the supply voltage of 12 V, with peak currents of preferably less than 4 A,
insensitive to oil contamination,
operating range to $-40°$ C.,
short time dry-running capability,
a series production model should be suitable for a number of applications,
low cost item, suitable for volume series production The above application profile can only be partially met by the conventional valves which have been used experimentally. These conventional valves are usually modifications of the state of the art ball and socket valves or slide valves. The design features of the ball and socket valve are shown in FIG. 10, those of the slide valve in FIG. 11. Analysis of the design characteristics shows that the ball and socket valve will require either high magnetic forces, because of the non-pressure equalized surfaces, or, for the case of small diameter balls, relatively large armature strokes. The slide valve design features the advantage of completely equalized pressure surfaces, but due to the necessary coverage of the leading edges, also requires a relatively large armature stroke of at least 0.4 mm. Because of the relatively large armature stroke, poor electromagnetic efficiency would result for the dimensions required for pulse modulated valves, and the kinetic energy of the moving parts would be relatively high. High kinetic energy results in increased wear and difficult to control armature chatter. For the above reasons, the presently used experimental valves of ball and socket design, or slide valve design, which are under test by the industry for pulse modulated pressure control, are still less than adequate, especially with respect to reliability under stressed conditions, and also with regard to durability.

Analysis shows that the necessary operating requirements can only be met by electromagnetic valves with very low armature stroke, and very small armature mass. Only with stroke dimensions in the preferred order of magnitude of about 0.1–0.2 mm, and armature masses of only a few grams can the demanded short floating times be achieved. It is a further known fact, that for better efficiency use of the magnetic force in electromagnetic valves, an adaptation to steady state characteristics is desirable. By this, it is generally understood that the sum of the mechanical and hydraulic counterforces at the initiation of armature movement should be considerably lower than counterforce magnitude at the termination of armature movement. By means of such a synchronization of the mechanical and hydraulic counterforces a good fit to the powerflow of the electromagnet is achieved, resulting in a considerable reduction in floating times.

However, it is to be noted that special electronic circuits are known where the exciting current is reduced after initial armature movement. In this case, the sum of the mechanical and hydraulic counterforces must be lower than the maximum force reduced by the special circuitry after anchor movement, so that a premature anchor drop-back is avoided.

This type of adaptation is usually achieved by a combination of several spring systems or by means of very stiff spring characteristics. Such systems have been proposed by the applicant in previous German applications (P 33 14 899, P 34 08 012). Systems which rely on mechanical means of adaptation are, however, rather problematic because of the required manufacturing precision. Systems with mechanical adaptation features are poorly suited for mass production of valves with very small armature stroke.

It is the objective of this invention to devise a fast-acting hydraulic three-way valve in miniaturized form which is characterized by small armature stroke and adaptation characteristics according to the requirements stated above. The valve can be operationally used in the 0.5–10 mm$^2$ cross-sectional flow range.

GENERALIZED SUMMARY OF THE INVENTION AND DESCRIPTION OF THE PREFERRED EMBODIMENTS

Based on the previously detailed requirements we initially developed a simple valve which had the advantages of having large cross-sectional flow diameters, but very small armature stroke. The design features of this valve are detailed in FIG. 12.

FIG. 12 shows the mechanism of a valve in accordance with the invention. In this figure, representation of the always necessary magnetic coil and the housing have been omitted for clearer demonstration of the design of the model. The mechanical components of this valve comprise a central armature guide 6, on which the armature 8 is located with a maximum radial clearance of 0.01–0.04 mm and is capable of movement in the direction of the axis. The armature 8 also serves as the valve obturator. The two armature face surfaces coordinate with the two valve seats 9 and 10. The upper valve seat 9 is formed by the magnetic pole 7. The lower valve seat 10 is formed by a collar of the valve guide 6. Pressure oil supply is via a central bore hole to the lower valve seat 10, oil return is via the upper valve seat 9 directly into the unpressurized surroundings of the valve (e.g., to the transmission housing). The controlled load element is formed by an oil-collection housing, which is not drawn, and which completely surrounds the armature. The direction of flow of the hydraulic fluid is shown by the arrows. Armature 8 is forced onto valve seat 10 in the off-position by means of a reset spring, which is not shown. Under the magnetic force, armature 8 is pulled against magnet pole 7 which is solidly connected to armature guide 6, where the counteracting force derives from the reset spring, which is not shown. To reduce the hydraulic gap forces the armature features short notches on both face surfaces. They are approximately 0.1 mm in height, and 0.3 mm in width. By means of this notched design the surface of the seat gaps is reduced and the velocity of flow in the rest of the face areas is reduced. The armature diameter is in the order of magnitude of about 10 mm, the armature stroke is about 0.1–0.2 mm. Other designs according to the basic principle of the invention are shown in FIG. 5, FIG. 6, and FIG. 7; they will be further detailed at a later point.

The principal design according to FIG. 12, and the other similar models according to the instant invention, is referred to as a seated slide valve type. The common feature of this design is the fact that in each case two valve seats are present, and that two spaces of differing pressure are sealed off from each other by radial guidance of the obturator.

By using a design according to FIG. 12, considerable advantages are realized in the range of valve opening cross-sections between 0.5–10 mm², especially over the designs exemplified according to FIG. 10 or FIG. 11. First of all, in comparison with a ball and socket valve, a considerably smaller actuating force is required because of the largely pressure equalized obturator surfaces. Furthermore, the valve seats can be designed with a relatively large diameter, resulting in a significantly reduced armature stroke, when compared to ball and socket valves, while maintaining the same cross-sectional flow values. Over slide valves of the type detailed in FIG. 11, for the same flow cross-section, a lower stroke results for the above specified range of opening cross-sections, and this is attributable to the fact that for seated slide valves according to the invention, the leading edges do not have to overlap in the axial direction. In contrast, for slide valves an overlapping of the leading edges is always necessary in order to satisfactorily seal the pressure spaces. In addition, for slide valves a multiplicity of incremental dimensions are necessary for the leading edges which must be maintained with extraordinary precision. Alternatively, the required stroke must be further increased in order to provide for the additional overlap necessitated by the lesser tolerances. In contrast, the seated slide valve according to FIG. 12 is especially easy to manufacture. The only critical tolerance values for proper operation in this case are the radial play and the armature stroke, these are easily handled from manufacturing point of view. Satisfactory sealing of the pressurized spaces is guaranteed by the long armature guide. All the necessary tolerance values can be met for the valve according to the invention by precision work on a modern lathe, without the necessity for expensive finishing work by precision grinding.

Despite the considerable advantages of the design according to FIG. 12, versus the conventional models of ball and socket valves or slide valves, the seated slide valve according to FIG. 11 still is characterized by certain disadvantages. These will be detailed further in the following:

The main disadvantage of the valve according to FIG. 12 is to be found in the non-equalized pressure forces in the valve seat region, or respectively in the face regions of the armature Because of these non-equalized pressure forces the valve is sensitive to pressure pulsations, which always exist with the pulse modulated operating procedure. The non-equalized pressure forces are caused by differential flow rates of the hydraulic oil in the face areas. The valve thus is only pressure equalized for completely symmetrical gaps, and for the theoretical ideal case of a pulsation-free load pressure which is half the supply pressure. The non-equalized pressure forces can only be reduced by reducing the gap width, or by increasing the height of the notch-features at the face surfaces. However, since the upper seat gap 9 also doubles as the working gap which produces the magnetic force, any changes in this geometry at this location are subject to narrow limitations. If the notch-feature is enhanced excessively, or if the armature thickness is reduced too much, it is no longer possible to generate the necessary magnetic force. For practical considerations it is therefore impossible to reduce the armature thickness to approximately less than 1 mm. Because of the non-equalized pressure surfaces, this type of model can therefore only be usefully employed up to maximum pressures of about 10 bar.

In addition, hydraulic fluid circulates through the working gap, which can result in the collection of magnetic particles in the area of working gap 9. The very small socket pieces in the seat gaps tend to be subject to excessive wear, especially during dry-running episodes. In addition, the oil collection space which surrounds the armature must be pressure-proof. Despite the listed disadvantages, the design according to FIG. 12 is well suited to simple applications because of the especially uncomplicated manufacturing features.

The above detailed disadvantages of the design according to FIG. 12 are virtually completely eliminated by a further seated slide valve design in accordance with the invention. This type of valve is also well suited for high pressures up to approximately 200 bar. A schematic of such a valve is provided as FIG. 13. As in the case of FIG. 12, the always required magnetic coil and the valve housing have been omitted.

The principal characteristic feature of the valve according to FIG. 13 is the collar 16, which is located at the lower end of armature 13 and cooperates with valve seats 14 and 15. Armature 13 is borne by armature guide 11, with a small amount of radial play, and is capable of movement in the axial direction. Magnetic pole 12 is solidly joined to armature guide 11. The flow direction of the hydraulic fluid is indicated by the arrows. The valve is kept in off-position by the pressure of the hydraulic fluid. The length of armature 13 is so chosen as to allow for a permanent air gap of about 0.1 mm between pole 12 and the face surface of the armature, for the case of the magnetically attracted armature. The permanent air gap results in a considerable improvement of the operational characteristics of the valve. The residual air gap causes a fast decay of the magnetic field, after the energizing current is switched off, resulting in a shorter drop-off time of the armature. Of greater importance, however, is the unhindered movement of the hydraulic oil into and out of the air gap, which is made possible by the residual air gap. This considerably reduces the attenuation of armature movement by the oil still present in the air gap. The residual air gap is perfused by a small amount of overflow oil which escapes from the armature bearing region between armature 13 and armature guide 11. The overflow oil stream guarantees that the air gap is always completely surrounded by hydraulic oil, and thus the conditions in this region are always well defined. This also improves the time related stability of the floating movements. The pressurized oil is admitted to the upper valve seat 14 via a central bore hole in the armature guide 11. The outer diameter of the upper valve seat 14 is chosen to be a few tenths of a millimeter less than the diameter of the armature bearing. This generates a non-equalized pressure surface which, for the case of an attracted armature, results in a reset force. The oil collection space of the valve is located inside the armature collar 16. From there, the oil is concentrically conducted to armature guide 11 by means of an annular channel, and then to the hydraulic load element. For the case of the attracted armature, the hydraulic oil is discharged via valve seat 15 to an unpressurized external space in the area of the valve housing, which is not shown. The internal diameter of valve seat 15 is about 0.2–0.5 mm less than that of the armature bearing. Because of this difference in diameters, a further non-equalized pressure surface is generated, which generates the necessary force to keep the armature in the off-position.

The width of the annular contact surface (overlap region) in the area of the valve seats should in general be 0.2–0.3 mm. With this dimension for the overlap region, the wear producing peak forces in the seating gaps are held to tolerable values. A further limitation of the peak forces, and a short-time dry running capability is achieved by the minute flexibility of the armature collar. If the flexibility in this region is too large, however, an increase in armature chatter results. A favorable compromise is achieved for a collar thickness of about 1 mm.

The choice of the non-pressure equalized surface in the region of the upper valve seat 14 should be such that the thereby generated reset force is by 40–50% lower than the electromagnetic force in the energized state. The choice of the non-pressure equalized surface in the region of the lower valve seat 15 should be such that the closing force of the valve in off-position generated thereby is only about 20% of the maximum force of the electromagnet. By dimensioning in this fashion, the desired adaptation to steady state conditions is achieved, which results in very short armature floating times.

Models in accordance with the principal design according to the invention, as shown in FIG. 13, are shown in FIGS. 1–4, 8, and 9; they will be detailed more explicitly in the following.

Pulse modulated hydraulic valves according to this invention are characterized by the combination of at least the following common features and critical operating dimensions:

- Armature and obturator are a single solid unit, preferably manufactured out of one piece, and with a total mass of only a few grams.
- The valve stroke is significantly less than 0.5 mm, preferably 0.05–0.2 mm.
- The bearing arrangement for the valve obturator is such that a radial clearance of less than 0.05 mm is involved and the valve obturator is movable in the direction of the axis, and this bearing arrangement simultaneously guides the armature and also serves to separate two spaces of differing pressure.
- The valve obturator coordinates with two alternately closing valve seats.
- The seating surfaces of the armature, in both directions of movement, are exclusively defined by the valve obturator.
- The seating surfaces of the armature are perfused by the main oil stream prior to the armature reaching its final position.
- The valve seats feature approximately the same radius as the armature bearing, where the average radius of the valve seats does not deviate by more than ±1 mm from that of the armature bearing, and where this deviation of the radii of the valve seats preferably shall not exceed 0.4 mm.

By the specific dimensions detailed in the following, the above specified valve is brought to the desired steady state adaptation: the average radii of the valve seats and the armature bearings differ from each other in such a manner that non-equalized pressure surfaces result, and the dimensions of these pressure surfaces are chosen in such a manner that the sum of forces from a possibly present reset spring, and the pressure force resulting from the non-equalized pressure surfaces, at the beginning of armature movement, is more than 50% lower than the maximum force of the electromagnet, and is less than 50% lower than after the armature has seated.

The individual features of the valve, taken separately, may indeed be state of the art. The achievement of the invention is above all to be found in the combination of the characteristic features, which must, at a minimum, be present to first of all guarantee the operational suitability of the valve for the case of the pulse modulated application mode. By expanding on this minimum combination of characteristics, additional considerable improvements can be obtained. These improvements will be further addressed in detail at a later point.

DETAILED DESCRIPTION OF SPECIFIC EMBODIMENTS

Figure 1:
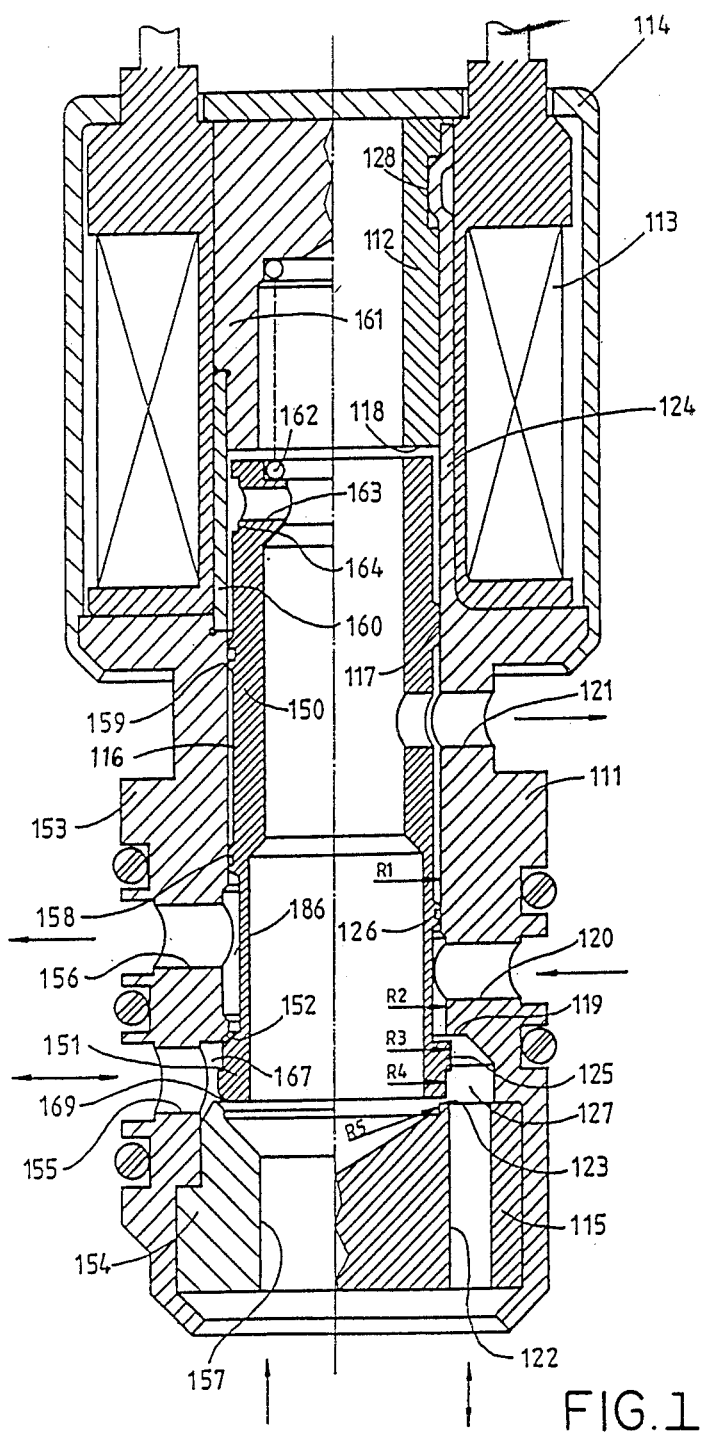
FIG. 1 is a longitudinal cross-sectional view through a first embodiment of valve according to the invention, the left half showing a slightly modified form from the right half.

A functional and preferred design of the pulse modulated valve according to the invention is shown in FIG. 1. In contrast to FIG. 13, in this case the valve obturator is housed in a drilled hole, while the armature in FIG. 13 features an internal bearing arrangement. In order to demonstrate the good suitability of the basic concept, FIG. 1 shows two different hydraulic connection modes, juxtaposed in the same drawing. The right half of FIG. 1 demonstrates a connection mode where the load element in the off-position of the valve is connected with the pressurized oil reservoir. This is the situation for an electromagnetic three-way valve, where the resetting of the armature is only caused by the hydraulic supply pressure. This makes it possible to omit the otherwise necessary reset spring. The left side of FIG. 1 shows a connection mode where the load element in the off-position of the valve is connected to the unpressurized return oil flow. Flow directions are indicated by the arrows.

The valve features extremely small dimensions. The outside diameter of the valve represented by FIG. 1 is only about 20 mm. The scale of the drawing, as filed, is 5:1. The electromagnet of the valve is operated by magnetic coil 113. The magnetic circuit consists of magnet pole 112, armature 116, the magnet housing 114, and side flange 111 to the housing. These construction elements are made of magnetically soft material, which provides for good conductance of the magnetic force lines. With armature 116 in the seated position on seat 119, a permanent air gap 118 of preferably about 0.1 mm remains between armature 116 and pole 112. Magnetic pole 112 is solidly held by pressure fitting into the groove 128 of the housing. Housing section 124 has been transformed into austenitic non-magnetic material, by state of the art heat treatment, in the region of the permanent air gap 118 in order to avoid a magnetic shortening out of the air gap. Armature 116 and valve obturator 125 are an integral structural unit. This movable element has an exceedingly small mass of usually about 2-5 grams.

The armature stroke is limited by valve seats 123 and 119. The upper valve seat is part of the housing side flange 111. The lower valve seat is found on the sealing plug 115 which is fastened to housing side flange 111 by flanging. Valve obturator 125 is located between the two valve seats, it is of collar-type design at the lower end of the armature. Obturator 125 features a graded design as indicated by the radii $R_3$ and $R_4$. By means of this graded, or stepped, construction, the operationally important exact maintenance of the seat-widths is achieved, as well as the desired functional adaptation, and these objectives are achieved by means which are simple in manufacturing terms. The specific dimensions employed in the stepwise design will be explained later in detail. The armature is located inside the housing with radial clearance of preferably 0.01–0.04 mm and can be axially displaced. The armature is undercut along almost the total length, so that contact with the housing only occurs in the range of the short bearings 117 and 126. This undercutting of the armature considerably reduces viscous frictional forces. This allows armature movement even at very low oil temperatures. The depth of undercutting must be at least 0.5 mm for valves intended for transmissions with an operating range to −40° C. For media with relatively low viscosity, e.g., Diesel oil, the undercutting can frequently be dispensed with. The bearing diameter usually is between 6 and 12 mm. Given adequate depth of the undercutting, the viscous frictional forces in the bearing areas are virtually only a function of the total surface of the bearings. The bearing contact areas should therefore be held as short as possible. In the case at hand, the length of the bearings 117 and 126, in the axial direction, was fixed at 1 mm each.

Oil flow through the valve is indicated by the arrows. Oil supply from the pressurized source is via side inlet 120. From there the oil passes via the upper valve seat 119 to the controlled pressure region 125, which is connected via passage 122 with the hydraulic load element. With the armature in the energized state (on-position), the controlled pressure region is connected, via the lower valve seat 123, with the virtually unpressurized interior volume of the valve. From the interior volume of the valve, the oil passes through the central bore hole of the armature to a side outlet 121 in the housing, and is then directly released to the transmission housing when the valve is used as transmission valve.

The differing pressure regions are separated by means of the lower armature bearing 126, which is provided with a circumferential relief channel to reduce frictional forces. Such relief channels are state of the art means to reduce radial interference forces. Such forces arise because of unequal pressure distribution in the bearing gaps. The relief channel thus serves to balance local pressures in the area of the bearing gap. In the region of the upper bearing location 117, such a relief channel is not required, since both sides of the bearing are at approximately the same pressure, and no differential pressures arise. It is a matter of course, that in place of only one relief channel, several may be arranged side by side, resulting in a further minor reduction of the radial interference forces.

Inside of the seating gaps of the valve seats a complicated pressure distribution prevails during individual floating movements; it can be subdivided into five relatively clearly delineated main phases. At the beginning of a transition, the seating gap is opened up by the external forces which attack at the valve obturator. This initial phase is designated as "initial opening phase" by the applicant. During this initial opening phase, in almost all cases, a vacuum is formed in the seating gap, the reason is that the gap opens faster than the pressurized oil can flow in. This vacuum formation occurs generally during the initial lifting of the valve obturator by 0.1 to 10 micrometers, and essentially is only a function of the width of the gap and the oil viscosity. Because of this vacuum formation, and despite the somewhat undefined initial force during the very beginning of the opening event, it is possible to achieve stable floating times. It is, however, a precondition for stable transition events, that defined conditions prevail in the immediate surroundings of the valve- and armature-seats, a situation which, according to the instant invention, is obtained through the fact that the armature seats are in fact provided by the valve seats, which are continuously perfused by the main oil stream. After the initial lifting of somewhat more than 10–30 micrometers, the seating gap is completely filled with flowing oil. During this second phase, essentially only dynamic flow forces are active, and, in first approximation, it can be assumed that at the border areas of the gap approximately the same pressure conditions prevail as in the adjoining low pressure region. During this main opening phase, the opening forces are thus approximately constant. The main opening phase, for valves according to the instant invention, generally covers about 80% of the maximum stroke range.

The third phase characterizes the beginning of the closing. The initial closing phase covers up to 95% of the maximum stroke. During this, about the same conditions prevail as in the main opening phase. Thus, for the main opening phase, it can also be assumed that at the border surfaces of the gap approximately the same pressure exists as in the adjoining low pressure region.

During the following fourth phase, the oil is forced out of the gap by the closing event. This phase is designated as the "displacement phase" by the applicant. During this displacement phase at first a pressure distribution occurs, with a maximum about in the middle of the gap. For the valves under discussion here, with gap widths of about 0.2–0.3 mm, this pressure maximum amounts to about 500–2000 bar. Mechanical contact between seat and valve obturator does not take place during the displacement phase.

In the subsequent fifth phase, after a few milliseconds, mechanical contact between seat surface and valve obturator is established, resulting in an approximately linear pressure drop-off between the pressure regions separated by the seating gap. This fifth phase, applicant likes to call the "seating phase." The time involved in this seating phase is essentially only a function of the oil viscosity, the external closing forces, and the width of the seating surface.

Because of the variable time sequence of the individual operating transitions of the valve, adequate time for completing the seating phase may not always be available. Therefore, the forces in the seating gap at the beginning of the gap opening event are not always exactly defined.

The relative magnitude of the undefined gap opening force is a function of only a few technically controllable main parameters. These main parameters are, with the exceptions of the fixed supply pressure and the viscosity, only the width of the seating surface, which thus should be chosen to be as small as possible. The minimum permissible seat width is defined by the pressure spikes which occur in the seat gap during the closing event. Computer simulation has established that the seat width for the valves here under discussion should always be between 0.2–0.3 mm in case of non-hardened seats. The pressure spikes occurring during the closing of the valve, for the stroke range of the valves under discussion, are then always less than a few thousand bar. Such pressures are easily accommodated, even by unhardened material, under continuous abrasion proof use conditions.

For hardened materials, it is possible to reduce the seat width to about 0.1 mm. The maximum pressures in the seating region can then rise up to 10,000 bar by the reduced seat width, interference forces in the seating area are reduced. Thus, by means of reduced seat widths a more time stable floating behavior can be obtained. If the seats are ground, a hardening process improves their machinability. Of course, a hardening step always involves additional costs. The preferred hardening procedure would be surface hardening by nitration in a salt bath. The adaptation to steady state conditions and the hydraulic armature resetting, which are characteristics of the instant invention, are caused by differential pressure surfaces in the valve seat region. These differential pressure surfaces are obtained in ways which are especially easy from a manufacturing point of view, by specifying different radii for armature bearing, upper and lower valve seat, and the lower and upper segments of the valve obturator. The progress of the hydraulic closing force will be explained in the following for one complete event, starting with the pick-up of the armature.

In FIG. 1, the valve obturator 125 is forced onto the lower valve seat 123 by the supply pressure, given that the valve is in the rest position. The width of the lower seating surface was chosen to be about 0.2–0.3 mm. It results from the difference between the external radius $R_4$ of the lower part of valve obturator 125, and the internal radius $R_5$ of the lower valve seat 123. The internal radius $R_5$ of the lower part of valve seat 123 has been designed to be the same as the bearing radius $R_1$. Thus, the mean radius of the lower seating surface results from the sum of bearing radius $R_1$ and half the seat width of preferably 0.2–0.3 mm. Because of this slightly larger mean radius of the lower seating surface, with reference to bearing radius $R_1$, a non-pressure equalized surface is created, which produces a positive hydraulic closing force.

With these chosen dimensions, the maximum possible opening force during the beginning of armature pick-up is the result of the product of supply pressure and seating surface. The electromagnet must be capable of clearly exceeding this opening force during armature pick-up in order to guarantee complete armature movement, even under the most disadvantageous operating conditions.

With the armature in the attracted position, the hydraulic reset force is generated by the non-equalized differential surface, resulting from the difference in bearing radius $R_1$ and internal radius $R_2$ of upper valve seat 119. For the valve shown in FIG. 1, the internal radius $R_2$ was chosen to be about 0.2 mm larger than radius $R_4$ of the lower seating edge. The reset force is further enhanced by the pressure increase within the upper seating gap.

Based on the above descriptions, the general design of valves which conform to the instant invention, can be executed quickly, safely, and with adequate precision for practical applications, allowing for some simplifying assumptions. To this effect the following rules apply:

The maximum initial force during the start of armature movement results as the sum of the pressure forces attacking at free surfaces, and the force exerted by a reset spring which may be present. This assumes the formation of a vacuum in the region of the closed valve seat. The minimal reset force, which can be counted on, results in analogous manner from the sum of the forces which act on free surfaces in the case of the attracted armature, and the force exerted by the possibly present reset spring. In this case too, the formation of a vacuum in the region of the closed valve seat is assumed.

The technical realization of the invention will be further explained by examples of additional variations. Emphasis will be placed on the many possible channel designs. Various channel designs are a requirement for simple adaptation of the valves to the predetermined installation geometries given by the users. The left side of FIG. 1 shows a valve where the load element is connected to the unpressurized return oil flow in rest position For such a hydraulic connection mode, valves according to this invention always require a reset spring, so that the valve seat connected to the pressure oil source remains in the closed position. In contrast, for connection modes where the load element in the rest position of the valve is connected with the pressure oil source, the reset spring may be omitted. Resetting of the armature then is by means of the non-pressure equalized free surfaces, as has already been explained for the design in the right half of FIG. 1.

For the valve represented in the left half of FIG. 1, valve obturator 151, in the rest position, is forced onto the lower valve seat 169, by reset spring 162. Valve obturator 151 and armature 150 are a single integral piece. Oil supply from the pressure oil source is via central bore hole 157 in the lower sealing plug 154 and is directed to the internal volume of the valve. From there, for the case of the attracted armature, the oil passes via lower valve seat 169 into the controlled pressure region 167. From there, the oil exits via side opening 155 to the hydraulic load element. In the rest position of the valve, the oil returns from the load element via side opening 155 into the controlled pressure region 167. From there the oil proceeds via upper valve seat 152 into the virtually unpressurized oil-collection space 186. Collection space 186 connects via bore hole 156 with the return oil circuit. Oil-collection space 168 is formed by a recessed section of about 0.5 mm depth in both the armature and in housing 153. By recessing the armature, the advantage of a slight reduction in armature mass is realized. By recessing the housing 153, the advantage of removing any possible machining flash, connected with bore hole 156, from direct contact with, and possible damage to, the operating surfaces of the bearing during installation, is realized.

Valve seats 152 and 169 are of slanted design; the seating angle should preferably be 45°. The advantage of the slanted design for the seats, over a right angle design, is to be found in the fact that the obturator is additionally centered, and the pressure forces in the seating gap are reduced. These reduced pressure forces are explained by the fact that, for a given seat width, the projected area of the seat in the direction of the axis is reduced by the slanted design. The slanted design thus makes it possible, for a given permissible pressure load, to reduce the projected surface in the axial direction. This causes a reduction in the required actuating force, which essentially is determined only by the projected surface. In addition, the slanted design results in a better sealing effectiveness of the seat. The disadvantage of the slanted design is in the significantly more complicated machining and a reduced flow cross-section compared to a right angled arrangement for the seats. The reduced flow cross-section requires an undesired increase in the armature stroke. The slanted seat design should thus only be considered for especially high sealing requirements of the valve, or to reduce the necessary actuating force for very high control pressures. The previously mentioned favorable seat width of 0.2–0.3 mm also applies for the slanted seat design. By seat width, the width of the gap parallel to the direction of flow in the gap is always understood.

The internal radius of upper valve seat 152 is the same as that for the armature bearing. The external radius of upper valve seat 152, given the slanted seat design, is preferably approximately 0.15–0.2 mm larger than the armature bearing radius. For these dimensions, a seat width of about 0.2–0.3 mm results. From the projected surface of upper seat 152, a non-equalized pressure surface results, which, for the attracted armature, generates a force in the closing direction of seat 152. This force is directed counter to the force of the spring, and results from the product of supply pressure and projected surface. The force exerted by reset spring 162 could be in fact higher than the maximum magnetic force, given the hydraulic counter forces, but should, for reasons of operational safety, be at least 20% less than the maximum magnetic force. Otherwise, complete armature seating might not be guaranteed for low supply pressure.

The internal diameter of lower valve seat 169 is by several tenths of a millimeter larger than the diameter of the armature bearing. This results in a free pressure surface with a resulting force which is also counter to the force of the spring. The resulting pressure force derives from the product of surface and supply pressure. It should amount to about 50% of the force of the reset spring. The width of the lower valve seat should also be about 0.2–0.3 mm. Because of the free pressure surface in the region of the lower valve seat, and the pressure buildup in the valve seat, it is possible to design for an opening force at the beginning of armature pickup which is only a minor fraction of the maximum magnetic force. By these means, the desired adaptation to the steady state is achieved.

The pressure spaces are separated by bearing locations 158 and 159 of armature 150. The bearings are provided with relief channels. The overflow oil through the bearings must pass the upper region of the valve, resulting in a quick emptying of the internal valve space. Magnetic pole 161 is connected to valve housing 153 by means of the non-magnetizable bracket 160. This connection can be achieved by state of the art methods, such as hard soldering, laser welding, or pressure fitting. The upper external section of the armature is connected to the internal space of the valve by an additional bore hole 163. This distinctly reduces pressure buildup in the region of the working gap. Low viscosity media do not require this additional connection. For the attracted armature, the working gap remaining between pole and armature should be about 0.1 mm. For extremely viscous media (e.g., transmission fluid at −40° C.), it may be necessary to provide for a working gap of up to 0.2 mm.

The valve according to FIG. 1 offers the advantage of especially simple manufacture. All operationally important tolerances can be met without differentiated precision tolerance requirements. Given the gradated design of the valve obturator, it is especially simple to meet the required dimensions in the seating gap regions. Armature stroke is the difference between the length of the valve obturator and the distance between the two valve seats. The length of the working gap between pole and armature is defined by the difference of the length of the lower valve seat and the pole, and the length between the facing surface of the armature and the upper edge of the valve obturator. Virtually all the operationally critical dimensions can be produced in a single working step requiring only one-sided mounting of the work piece. Thus, manufacture is possible with high precision and with relatively simple machining steps. In general, the valve can be directly mounted without requiring special matching of individual component parts. The experienced manufacturing expert will see these connections even from the drawings. The virtually completely unnecessary imposition of differentiated precision tolerance requirements also applies for the other models of the valves according to this invention. Thus, all the varied design types of the valve are especially suited for mass production. This special suitability for simple manufacture will no longer be specifically mentioned for the other models described hereafter.

Figure 2:
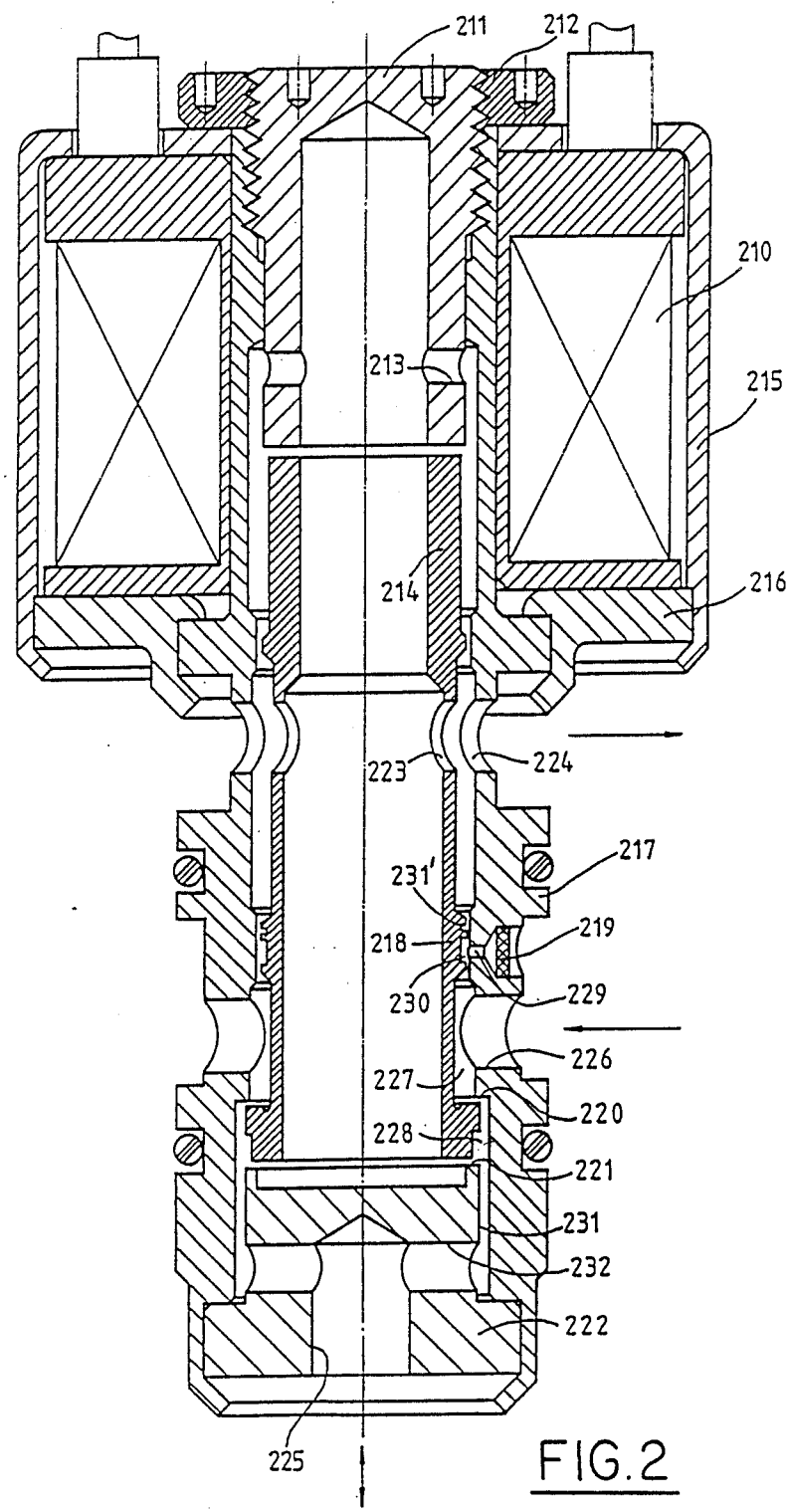
FIG. 2 is a longitudinal cross-sectional view through a second embodiment of valve according to the invention.

FIG. 2 shows a valve which is especially suited as a pressure control device in automatic transmissions. The valve features hydraulic armature reset. The hydraulic load is connected with the pressure oil source in the rest position of the valve. The dimensions of the radii in the valve seat region are the same as shown for the right half of FIG. 1.

The pressurized oil passes through side opening 226 in valve housing 217 to the collection space 227. From there, the oil goes to the controlled pressure space 228 via upper valve seat 220. The controlled pressure space is connected to the hydraulic load element by a side slot 231 between valve housing 217 and sealing plug 222 and also via passages 232 and 225. By means of this oil channeling an especially small outer diameter of the valve is made possible in the lower valve section. The different pressure spaces are separated by bearing 218. Bearing 218 features a circumferential groove 230 which is supplied with pressurized oil via filter 219 and bore hole 229. Thus, the overflow oil stream is almost only filtered oil. This measure prevents contamination of the bearings with abraded particles. The filtered oil passes through relief slot 231' to the upper unpressurized armature region. Armature 214 and the bearing locations in the housing are undercut by about 0.5–1.0 mm to reduced viscous friction forces at very low oil temperatures. From the controlled pressure space 228 the oil passes into the interior space of the valve, and from there, via side openings 223 and 224 to the unpressurized outer valve regions. Valve housing 217 consists of magnetizable material which has been transformed into non-magnetizable material in the working gap region using a heat treatment step. To reduce pressure buildup in the working gap during armature movement, pole 211 is equipped with side-relief openings 213. Pole 211 is connected with the throat of the valve housing 217 by means of a threaded connection and secured against displacement by nut 212. The threaded connection allows for a simple way to calibrate the valve. To this effect, the working gap is set in such a manner, with the armature in the attracted position, that a given set point as specified is reached. The magnetic circuit is closed by means of lower cover 216 and coil housing 215, both consisting of magnetizable material.

Figure 3:
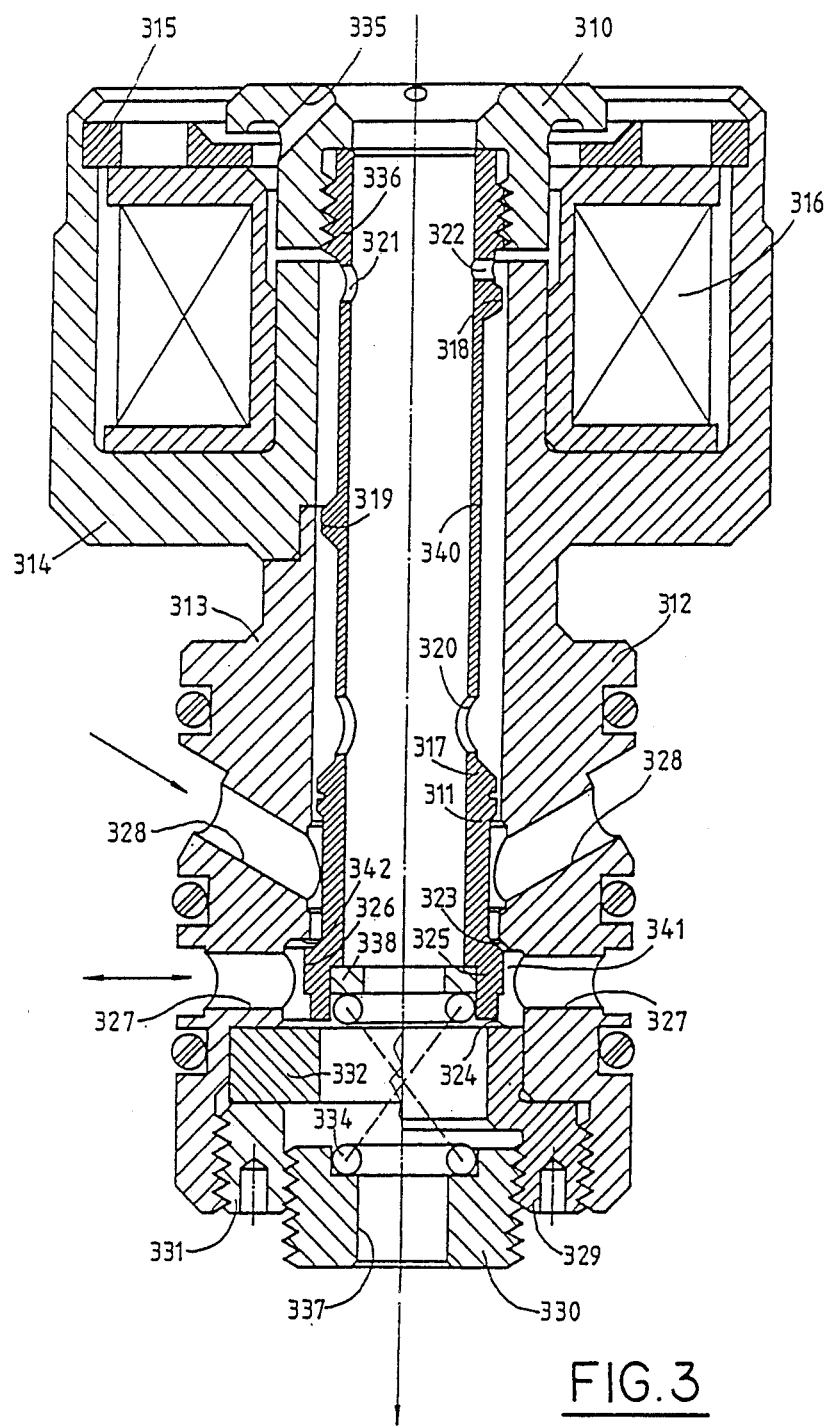
FIG. 3 is a longitudinal cross-sectional view through a third embodiment of valve according to the invention, the left half showing a slightly modified form from the right half.

FIG. 3 demonstrates a valve which is specifically suited for pilot control of Diesel injection valves using the cumulative method. Such an injection system is described as an example in SAE Paper 840273 ("Direct Digital Control of Electronic Unit Injectors"). The design pressure of the valve is about 150 bar. The hydraulic load element is connected with the oil return for the valve rest position.

The valve features a hat-shaped armature 310 with a double working gap. The double working gap makes it possible to reduce by one half the maximum magnetically conducting cross-sections, for a given total pole surface, since only the latter is determining for the maximum magnetic force. Because of the reduced cross-sections, in comparison with a magnet with only one working gap, the formation of eddy currents in the magnetic conductor is considerably reduced, resulting in faster action times. The outer magnet pole is formed by the surface of pole plate 315, which lies opposite the hat-shaped collar of armature 310. Pole plate 315 is fastened to magnet housing 314 by flanging. Pressure buildup below the armature on pick-up, due to the displaced fluid volume, is reduced by means of relief openings 321, 322, and 335.

Armature 310 is joined to guidance sleeve 340 by means of threaded connection 336. Guidance sleeve 340 provides the base for valve obturator 325 and bearings 317 and 318. Pressurized oil supply is via opening 328 into the upper reinforced part 311 of the guidance sleeve. Reinforcing is necessary because of the high pressure load from the supply pressure. The separation of the different pressure spaces is by means of bearing 317, which is provided with a relief slot. Supply of pressurized oil is interrupted by valve obturator 325 closing against the upper valve seat 323, for the rest position of the valve. The oil passes from upper valve seat 323 into the controlled pressure space 341. The load element is connected to the controlled pressure space 341 via opening 327. Oil return is via the lower valve seat 324 into the unpressurized interior of the valve. From there, the oil exits through a central bore hole 337.

Valve obturator 325 is forced against the upper seat 323 by reset spring 334 in the off-position of the valve. Reset spring 334 is housed inside the valve obturator on a mounting plate 338. The lower end of spring 334 is housed inside set screw 330. Using this set screw, the dynamic characteristics of the valve are calibrated in known fashion. After calibration, set screw 330 is secured against further movement, for example, by mortising. Closing plug 329 is connected to valve housing 312 by threaded connection. The neck of closing plug 329 is housed in housing 312 with a small amount of radial play in order to achieve good centering of lower seat 324. The left half of FIG. 3 shows a variant where the closing plug 332 is fixed by a separate pressure screw 331. This model is simpler from a manufacturing point of view.

FIG. 3 describes two alternate shapes of the upper valve seat. A slanted seating arrangement on the right side, and a right angle arrangement on the left side. The slanted arrangement is favored for the application under discussion here. Pilot control of cumulative injection valves requires only a small amount of flow-through during the connection of the load element with the pressurized oil source. In addition, an excellent seal between load element and pressure oil source is demanded for the case of the rest position of the valve; this in order to keep overflow oil streams through the valve as low as possible. On the other hand, the valve cross-section between load element and oil return, which opens up during valve reset, should be as large as possible in order to achieve a well defined start of the injection process. These characteristics are obtained by combining slanted seating 323 with the right angled seat 324, as shown in the right half of FIG. 3. The disadvantage of such a seating design is the more difficult manufacture.

The internal diameter of upper valve seats 323 and 342, respectively, has been set at the same diameter as that of the armature bearing. The internal diameter of the lower valve seat 324 is a few tenths of a millimeter smaller than that of the armature bearing. This results in the desired adaptation to the steady state. For the application under consideration, it is advantageous to harden both valve obturator and the seats by means of a heat treatment. For hardened components, the seat width can be reduced to about 0.1 mm. Reduced seat widths result in a reduction of the actuating force requirements, providing for faster transition times. However, hardening degrades the magnetic properties of the housing material. Therefore, magnet housing 314 should then be fastened as a separate component to hardened housing 313. The joining can be done, for instance, by hard soldering. Such an arrangement is shown on the left side of FIG. 3.

The special advantage of the design according to FIG. 3 is to be found in the fact that the interior space of the valve is not under pressure load. This commends this type of model for use with high pressures. Representation of the upper housing closure and the electrical connections has been omitted in FIG. 3, since many design types are known for this from other electromagnetic valves.

Figure 4:
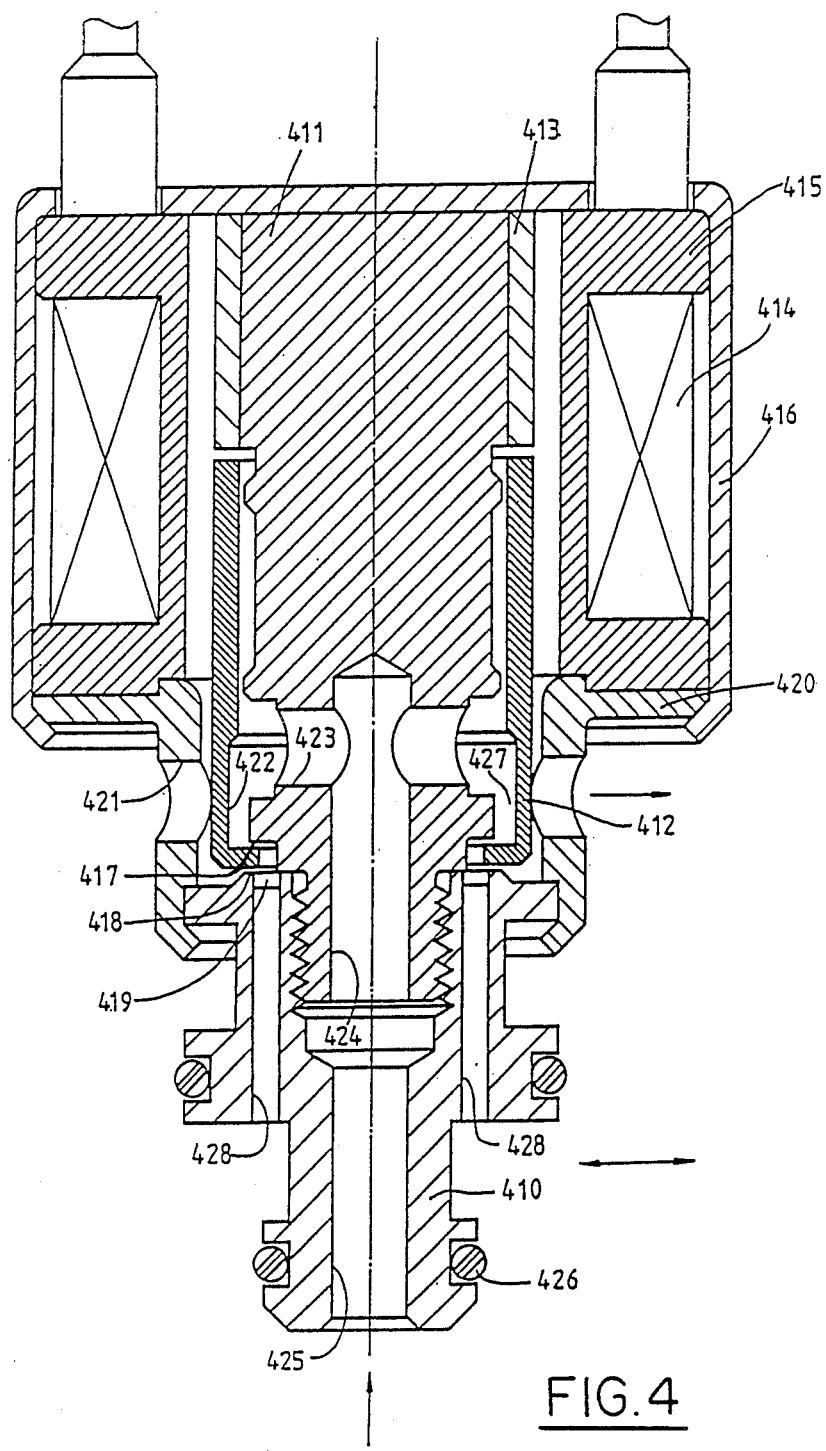
FIG. 4 is a longitudinal cross-sectional view through a fourth embodiment of valve according to the invention.
Figure 13:
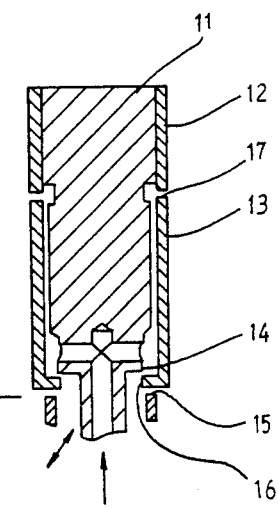
FIG. 13 is a longitudinal cross-sectional view of another generalized form of the invention.

FIG. 4 shows an especially simple design, with operating features which have already been detailed in connection with FIG. 13. In the rest position, this valve connects the load element with the pressure oil source. The valve features hydraulic armature reset.

Valve carrier 411 is threaded into connection plug 410. Pole 413 is pressure fitted onto valve carrier 411. The combination of the two is preferably machined together. For attracted armature 412, a permanent air gap of preferably 0.05–0.1 mm remains between armature 412 and pole 413. The armature features a recessed section 422 to allow free flow of pressure oil to upper valve seat 417. The pressurized oil reaches collection space 427 via openings 425, 424, and 423. From there the oil passes through upper valve seat 417 to the controlled pressure space, which is located above nut 419. The controlled pressure space is connected to the load element via nut 419 and bore hole 428. Oil return is via lower valve seat 418, and from there through bore holes 421 in the lower housing section 420 to the exterior of the housing. The lower housing section 420 is constructed of magnetically soft material and fixed to connection plug 410 by flanging. The magnetic flux passes through the side-air-gap between armature 412 and the lower housing section 420. Closing of the magnetic circuit to pole 413 is via deep-drawn drawn magnet housing 416, which is fastened to the lower housing section 420 by flanging. Coil holder 415 is centered by means of an undercut section in the lower housing section 420. Additional centering can be brought about in the upper segment of coil holder 415 at magnet pole 413. Connection plug 410 features a stepped design in order to prevent damage to sealing gaskets 426 during mounting of the valve into the transmission. It is to be mentioned, however, that this connection plug design results in additional axial forces acting on the mounted valve. The valve is fastened in the mounting hole by means of a clamp connection. The clamp attaches to the upper recessed section in connection plug 410.

Armature stroke is generally 0.1–0.2 mm. Armature diameter is typically about 10 mm, and the wall thickness of the armature is about 1 mm. Seat widths should preferably be 0.2 mm. The external radius of upper valve seat 417 is several tenths of a millimeter less than that of the armature bearing. The external diameter of lower seat 418 should be the same as that of the armature bearing in order to obtain low initial forces.

The valve offers the advantage of especially simple design and manufacture. Through the flexible collar type armature is the valve virtually totally wear-proof. The interior space of the valve is only exposed to the virtually negligible pressure of the return oil, allowing for light construction. Very short floating times can be achieved. Typical pick-up and drop-off times are 1–2 ms and can be further lowered by special electronic circuitry. The mode of hydraulic channeling shown for the lower connection plug is only to be considered as a preferred example. For diverse requirements from the application side, the pressure oil supply may also come from the side, and the controlled load element can be repositioned to the lower end. Such a model would, however, require crossing supply channels which imply a minor increase in manufacturing effort.

Figure 5:
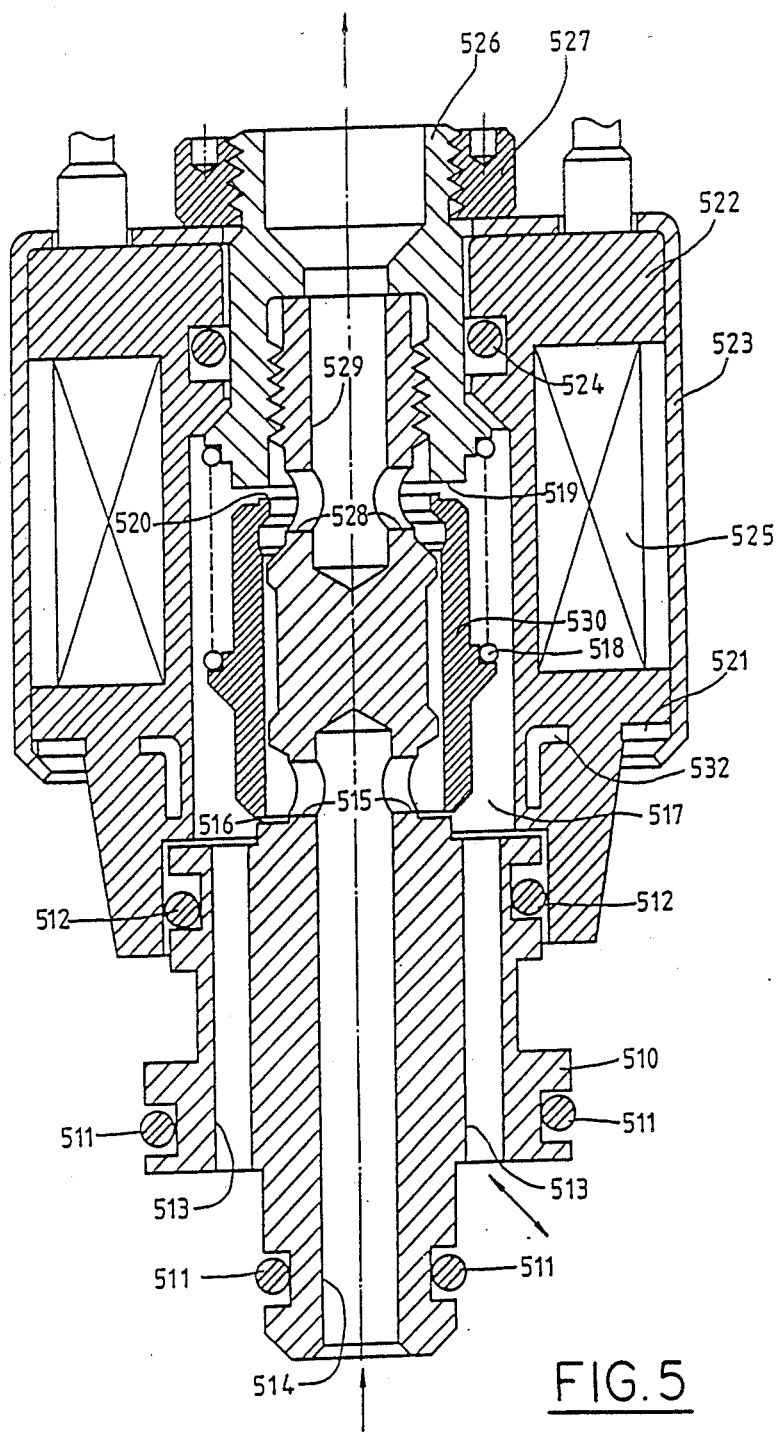
FIG. 5 is a longitudinal cross-sectional view through a fifth embodiment of valve according to the invention.
Figure 12:
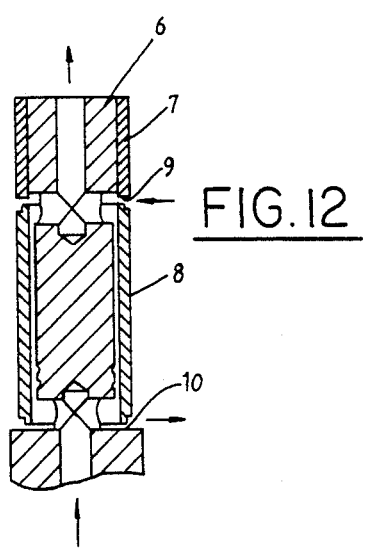
FIG. 12 is a longitudinal cross-sectional view of one generalized form of the invention.

FIG. 5 shows a simple valve where the controlling edges are located at the face surfaces of the armature. The hydraulic load element is connected to the oil return for the valve rest position. The principal operating parameters have already been detailed in connection with FIG. 12.

Armature 530 is housed on valve carrier 510 with slight radial play. The pressurized oil is guided via central passage 514 and side passages 515 to the lower valve seat 516. The controlled pressure space 517 is limited by coil carrier 522. The oil proceeds to the load element from the controlled pressure space 517 via bore hole 513. Oil return is via the upper valve seat 519 which is located on pole 526. From there, the virtually unpressurized return oil is conducted to the outside via passages 528 and 529. Pole 526 is threaded to valve carrier 510. Magnetic return is via magnet housing 523 and guidance plate 521, the guidance plate is enclosed by coil carrier 522. Coil carrier 522 preferably is made of a thermoplastic material. Guidance plate 521 is provided with perforations 532 to allow for proper distribution of the thermoplastic material during injection molding. The guidance plate is completely surrounded by the plastic material at the pressure side so that any possibility for a leakage channel along the plate is excluded. In addition, the guidance plate serves to mechanically reinforce the coil carrier. Coil carrier 522 and magnet housing 523 are forced onto valve carrier 510 by nut 527. The working gap, located between pole 526 and armature 530, is completely closed as the armature is attracted, so that at this location no working gap remains. In order to still obtain a sufficiently fast reset time, the side-air-gap between armature 530 and guidance plate 521 has been made relatively large. By doing so, the requirement for precision centering guidance plate 521 has also been significantly reduced. The armature surface facing the pole has been provided with a short muff 520, which is 0.1–0.2 mm in height. This muff considerably reduces the dynamic flow forces at the face region of the armature. In addition, the muff provides for a defined seating surface. The seat width of the valve seats preferably is 0.2–0.3 mm. The interior diameter of the lower seat is the same as that of the armature. The interior diameter of the upper seat 519 is a few tenths of a millimeter smaller than that of the armature bearing, in order to provide for the desired steady state adaptation. The dynamic behavior of the valve is considerably improved by the upper seat with its more internal position.

Figure 6:
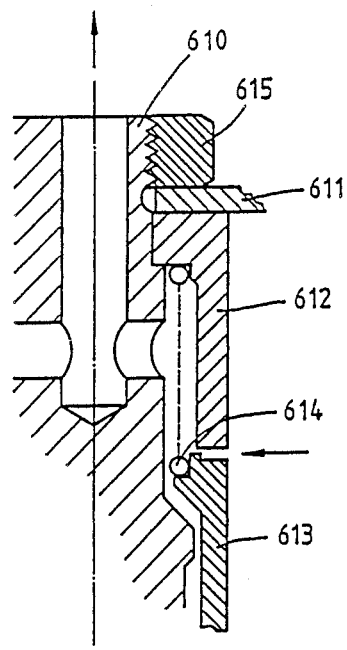
FIG. 6 is a fragmentary cross-sectional view illustrating a modification to the valve of FIG. 5.
Figure 10:
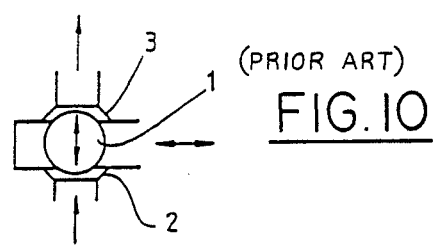
FIG. 10 is a schematic representation of one type of prior art valve.
Figure 11:
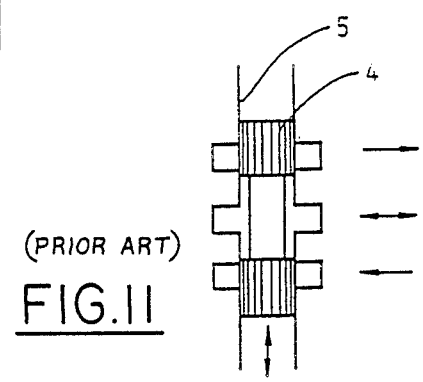
FIG. 11 is a schematic representation of another type of prior art valve.

The valve can alternatively also be equipped with an internally positioned spring, as shown in FIG. 6. In this case, reset spring 614 is located within pole 612. Pole 612 and magnet housing 611 are forced onto valve carrier 610 by nut 615. This type of arrangement allows for a reduced total diameter in comparison with the valve according to FIG. 5. In addition, the separate thread section to fasten the pole can be omitted.

Figure 7:
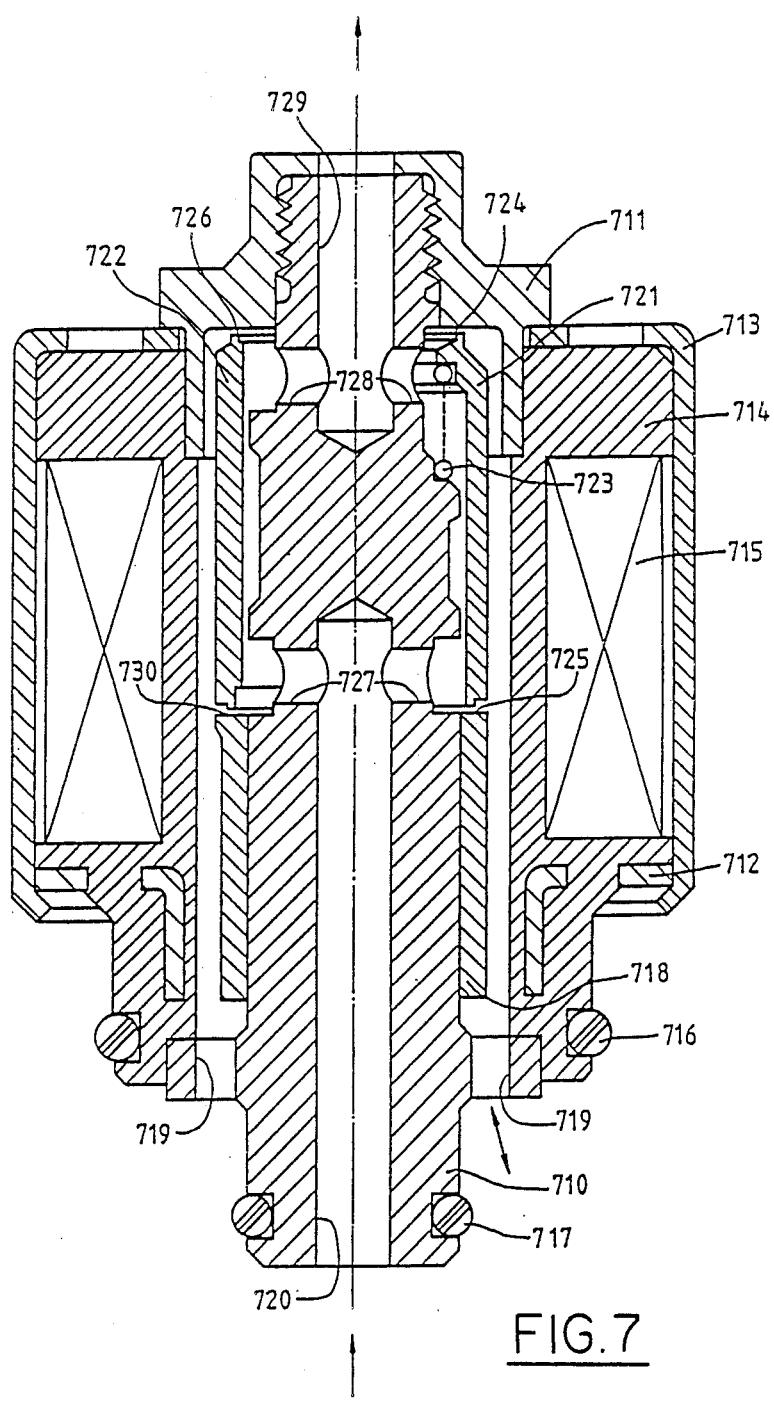
FIG. 7 is a longitudinal cross-sectional view through another embodiment of valve according to the invention, the left half showing a slightly modified form from the right half.

FIG. 7 describes another valve with leading edge control. Compared to the valve of FIG. 6, it features a different hydraulic connection mode, where the load element in the rest position of the valve is connected to the pressure oil source. The right half of FIG. 7 shows a valve with hydraulic armature reset. It can be stated in general that spring resetting as a rule results in a more stable dynamic behavior than hydraulic resetting. This is due to the fact that for hydraulic resetting, the reset force is directly dependent on the supply pressure. In contrast, the valves according to this invention are largely insensitive to variations in the supply pressure.

The magnetic circuit of the valve consists of pole 718, upper guide piece 711, magnet housing 713 and lower guide piece 712. The lower guide piece 712 is enclosed by the coil carrier 714. Coil carrier 714 is forced onto valve carrier 710 by means of the upper guide piece 711. The upper guide piece consists of magnetically soft material and is threaded onto valve carrier 710. Pole 718 is solidly mounted onto valve carrier 710 and both are machined as a single unit. Armature 721 is reset by the internally positioned spring 723. In the drawing on the left side, resetting of the armature is by means of the supply pressure.

Oil supply is via central passage 720 and side passages 727 through lower valve seat 725. From there the oil goes to the controlled pressure space located inside coil carrier 714. The controlled pressure space is connected to the load element via passages 719. The installation port is sealed by means of sealing gaskets 716 and 717. Gasket 716 is located on coil carrier 714. This arrangement allows omitting a special sealing device between valve carrier 710 and coil carrier 714. Oil return is via upper seat 724 or 726, respectively. From there the oil passes via passages 728 and 729 to the outside region of the valve. The face surfaces of armature 721 and 722, respectively, are provided with muffs of 0.1–0.2 mm height. Seat widths are about 0.2–0.3 mm.

In case of the valve with spring resetting, the internal diameter of lower seat 725 is identical with that of the armature bearing. Adaptation is by means of a smaller internal diameter of the upper seat 724, with reference to the armature bearing.

For the case of the valve with hydraulic resetting, the internal diameter of lower seat 730 is a few tenths of a millimeter larger than that of the armature bearing. This generates the reset force for the situation of the attracted armature. The internal diameter of upper seat 726 is the same as that of the armature bearing, or only slightly larger.

The valves described in FIGS. 5–7 exhibit some considerable disadvantages in comparison with those shown previously First of all, there is the disadvantage that the space surrounding the armature must be constructed in pressure-proof form. Furthermore, the seat located between pole and armature is exposed to the variable control pressure. Because of the variable control pressure, which in addition is present with a partial dynamic force at the total face surface of the armature, adaptation to the steady state can only be achieved to completeness in the case of hydraulically hard systems. Hydraulically hard systems are characterized by the fact that the load-pressure fluctuates between supply pressure and return-oil pressure during a given opening-closing event. In the case of hydraulically soft systems, on the other hand, an average pressure establishes itself at the valve, which remains virtually unchanged during operation. In addition, because of the absence of a working gap, at low oil temperatures very high impedance forces become effective. Therefore, these models should only be considered for simple applications. Their advantage, however, lies in the low cost of manufacturing.

Figure 8:
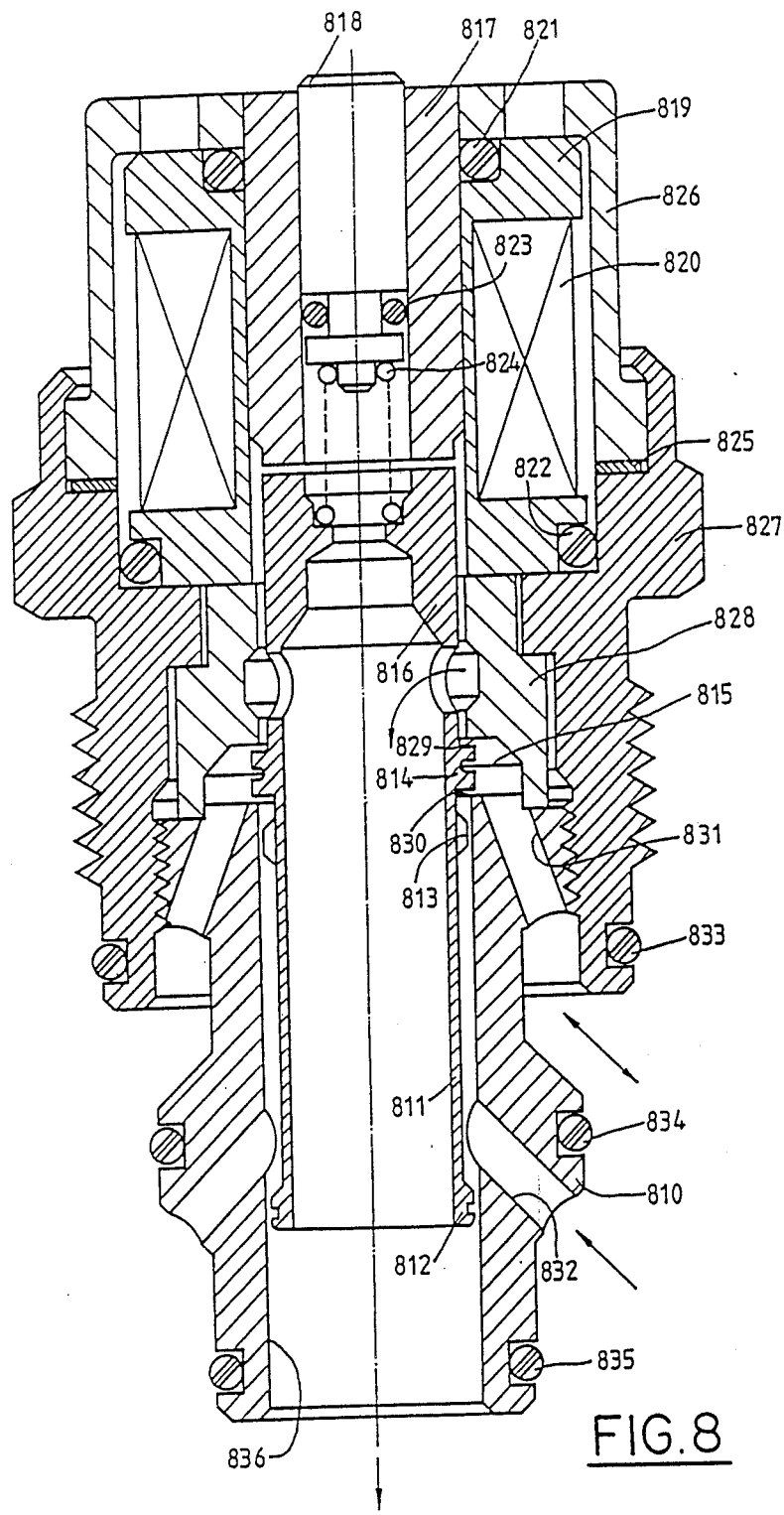
FIG. 8 is a longitudinal cross-sectional view through yet another embodiment of valve according to the invention.

FIG. 8 describes a further valve which is preferably suited to pilot control of Diesel injection nozzles. Design pressure is about 100 bar. The hydraulic load is connected to the pressure oil source for the valve rest position. The advantage over the valve according to FIG. 3 is that armature and obturator are a single unit. The valve is therefore easier to manufacture.

The magnet circuit consists of pole 817, magnet housing 826, housing body 827, and guidance piece 828. All these parts consist of magnetically soft material. Armature 816 is forced onto the lower valve seat 830 by spring 824 in the rest position of the valve. The upper spring is housed by pin 818. Pin 818 is pressure-fitted into pole 817. Spring tension is set by adjusting the pressure-fitted pin 818. This allows calibration of the dynamic characteristics of the valve. Magnet housing 826 is fastened to housing body 827 by flanging. A spacer 825 is inserted between magnet housing 826 and housing body 827. Spacer 825 is used to define the length of the permanent air gap between armature 816 and pole 817. The permanent air gap preferably is about 0.05–0.1 mm. Coil 819 is sealed off against the interior space of the valve by gaskets 821 and 822. Between armature 816 and guide piece 828, a side-air-gap is located, preferably with a width of 0.2–0.3 mm.

Pressure oil supply is via openings 832. From there the oil proceeds along the side of guidance tube 811, which is part of armature 816, to the lower valve seat 830. This side space is sealed against the interior volume of the valve by lower bearing 812. Bearing 812 features a relief slot. Upper bearing 813 is provided with slots which allow the oil to pass to the lower seat 830. In place of slots, the bearing may also be modified by other geometric shapes which allow passage of the oil through it. For instance, the bearing could be slightly ground down. From the lower valve seat, the oil proceeds to the controlled pressure space 815. From there, the oil is conducted to the load element by means of channels 831. The controlled pressure space is defined by valve carrier 810 and guidance piece 828. Guidance piece 828 is forced onto valve carrier 810 by housing body 827. Guidance piece 828 is centered in a recessed section of valve carrier 810 with a small amount of radial play. Housing body 827 is threaded to valve carrier 810. Return oil exits the controlled pressure space via upper valve seat 829 into the side space between armature 816 and guidance piece 828. From there, the return oil is conducted into guidance tube 811 via the side outlets of the armature. It then exits from the valve via seating passage 836. Valve obturator 814 is provided with a nut. The nut serves to improve the flexibility of obturator 814. As a result, peak loads in the region of the valve seats are reduced. This measure makes it possible to reduce the seat widths and, thus, the actuating force requirements. The valve is threaded into the function port. The supply channels of the valve are sealed off from each other in the port by means of gaskets 833, 834, and 835.

The internal diameter of lower valve seat 830 is the same as that of the armature bearing. Upper valve seat 829 in general has a slightly reduced diameter, with reference to the armature bearing, in order to achieve an increase in the reset force towards the end of armature movement Seat widths preferably are 0.2 mm. Alternatively, slanted seat arrangements would also be possible. For a slanted seat arrangement of upper seat 829, centering of the guidance piece 828 should be directly on obturator 814, and should be established during assembly of the valve. Recessing valve carrier 810, which serves to center guide piece 828, can then be dispensed with.

Figure 9:
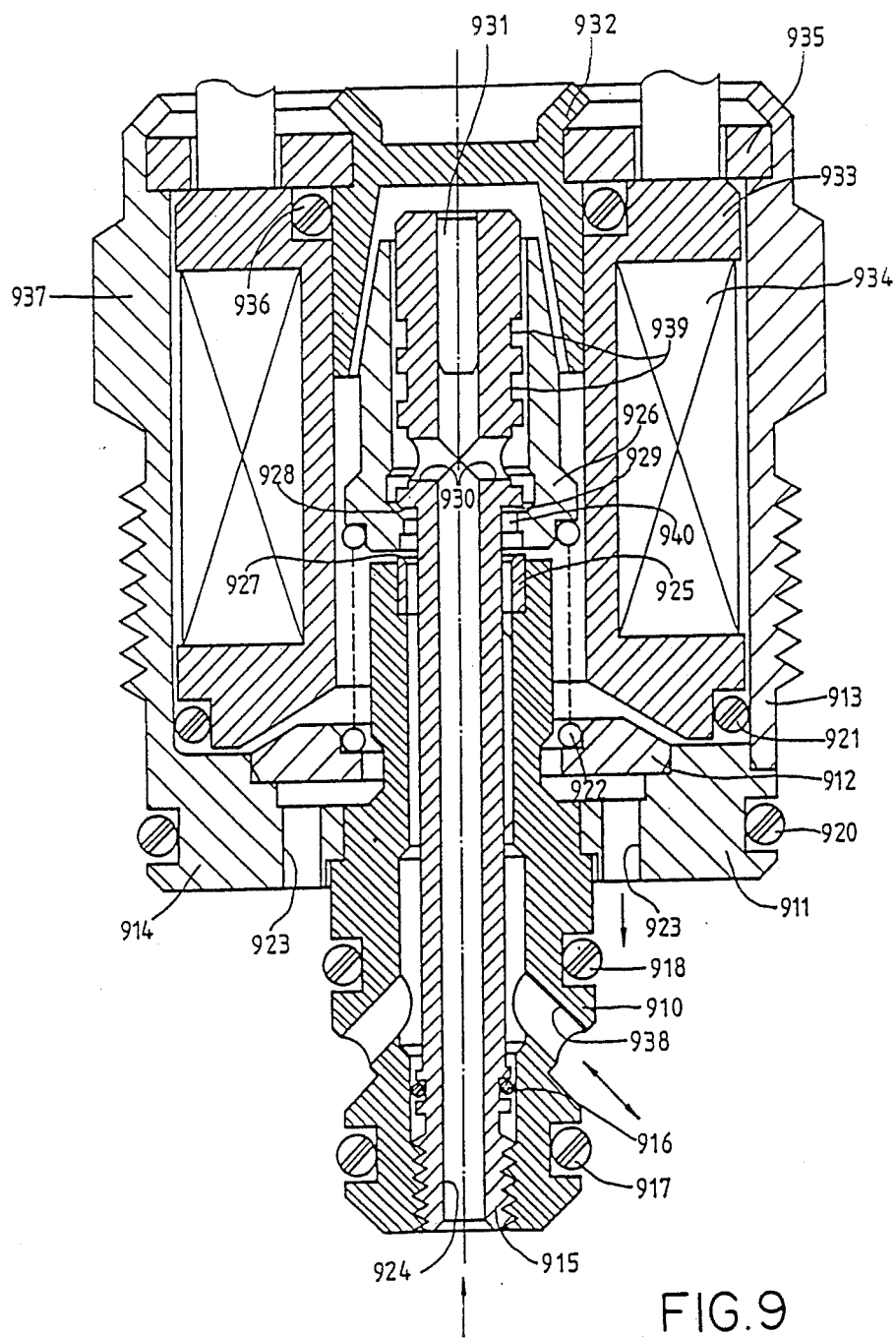
FIG. 9 is a longitudinal cross-sectional view through yet another embodiment of valve according to the invention.

FIG. 9 shows another valve which is preferably suited to pilot control of Diesel injection nozzles. Design pressure is about 100 bar. The hydraulic load is connected to the pressure oil source for the valve rest position. The valve features a novel magnet circuit with a conical flux guide, allowing for an especially compact design. The left and right sides of FIG. 9 show two alternative design concepts. In the left half of FIG. 9, the upper seat 928 is shown in slanted arrangement. In addition, magnet housing 914 is of one-piece construction. The right hand design shows the magnet housing as a composite of two construction pieces. This allows for manufacture of the housing shell 913 out of low cost thin-walled tubing. The magnetic circuit of the valve shown on the right side consists of armature 926, guidance carrier 935, housing shell 913, housing carrier 911 and pole 910. Guide piece 932, guidance carrier 935, housing shell 913, housing carrier 911 and pole 910 are joined together. The right angle working gap of the magnet is located between pole 910 and armature 926. Pole 910 is fitted with a spacer tube 925, which is not magnetizable, and extends about 0.1 mm above the pole. This provides for a permanent air gap for the attracted armature, which is desirable for fast decay of the magnetic field after switching off the energizing current. A special feature is the conical shape of the side-air-gap which is located between guide piece 932 and armature 926. Using this conical design allows for a considerably reduced external diameter of guide piece 932 than would be possible with conventional design of the magnetic circuit. With conventional design, the side-air-gap would be tubular, so that the cross-sections of armature 926 and guide piece 932 would remain about constant in the axial direction. The conical design makes for a slightly lower maximum magnetic force than the conventional design. This is caused by the fact that in the side-air-gap a force is generated which acts counter to the axial force acting in the direction of magnetic attraction. This counterforce is, however, so small for small conus angles that the disadvantage of the lowered maximum force is outweighed by the advantage of the more compact design. The conus angle should not be larger than 30°, and preferably should be about 20°. The surface of the side-air-gap should be several times the size of the pole surface.

Armature 926 of the valve is forced against upper valve seat 929 by the reset spring 922, in the rest position. Reset spring 922 is housed on spring support 912. Spring support 912 is centered in housing carrier 911 by a recessed section. Armature 926 is located on valve carrier 915 with a minor amount of radial play. The actuating forces are reduced by relief slots 939. Valve carrier 915 consists of nonmagnetizable material, and is preferably made from tubing.

Oil supply is via central bore hole 924 in valve carrier 915. Central bore hole 924 is closed off at the top by pressure-fitted pin 931. From there the oil passes via side passages 930 to the upper valve seat 929, which, for the rest position of the valve, is closed off. With an attracted armature, the oil reaches the controlled pressure space 940 via upper valve seat 929. From the controlled pressure space, the oil reaches the load element by means of the axial grooves within pole 910 and passages 938. The return oil comes back to the controlled pressure space by the same route; and passes from there via lower valve seat 927 into the internal volume of the valve, which is surrounded by coil body 933. From there, the now unpressurized oil is conducted away via openings 923. Coil body 933 is sealed off from the outside by means of gaskets 921 and 936. The valve is secured in the operating port by threaded connection. The threads are located on the outside of the magnet housing. The oil channels are individually sealed off by means of gaskets 917, 918, and 920. Valve carrier 915 is threaded to the magnet pole 910 and sealed by means of gasket 916. Armature stroke is set by adjusting valve carrier 915. Subsequently, the valve carrier is secured against further movement in the threaded section, preferably by means of spot welding.

The external diameter of upper seats 929 and 928, respectively, is the same as that of the armature bearing. The internal diameter of the lower seat 927 should preferably be slightly smaller than that of the armature bearing to produce an increase in the reset force for the magnetized armature. Seat widths should preferably be 0.2 mm.

In conclusion, it should be noted that the above examples are only to be understood as suitable preferred models. It is, for instance, entirely possible to adapt the valves to other pressure ranges, which frequently would necessitate slightly different dimensions. It is furthermore quite possible to combine individual characteristics of the listed valves with each other, resulting then in somewhat varying designs. For example, the case is highly likely that valves will have to be adapted to different modes of hydraulic connection and mounting conditions. This may require cross-over channels in the lower valve segment. Furthermore, valves which have been designed for plug-in fitting can of course be adapted to threaded fitting, should the application require this, or for the case where a high supply pressure makes it a necessity. In addition, the proposed methods for joining individual components of the valves are only to be taken as especially appropriate examples; flanging may, for instance be replaced by threading or pressure fitting. Based on the explanations, the expert will readily adapt the individual valves to variable requirements. In addition, the proposed applications in automotive hydraulic applications are also only by way of example. Specifically, the proposed pulse modulated valves can find application in the general field of hydraulics. The pulse modulated operating procedure will often result in a reduction of the hydraulic components, and provide for improved control of the hydraulic load elements. The useful application area, also in these cases, is however restricted to flow cross-sections of up to about 10 mm².

I claim:

1. A pulse width modulated three-way solenoid valve comprising valve body structure,
   (a) said valve body structure comprising a pressure port, a control port and a dump port serving to place the valve in a three-way fluid control circuit,
   (b) first and second annular valve seats spaced apart axially on said valve body structure,
   (c) a solenoid coil mounted on said valve body structure and adapted to be electrically modulated,
   (d) a tubular armature that is acted directly upon by an electromagnetic field issued by said solenoid coil in response to the electrical modulation thereof and that is axially displaced on said valve body structure in response to electrical modulation of said solenoid coil such that the respective fluid pressures at said pressure port and at said dump port are modulated to said control port in accordance with the electrical modulation of said solenoid coil,
   (e) said tubular armature comprising a radially outer surface portion and a radially inner surface portion,
   (f) said valve body structure comprising guide means confronting one of said surface portions of said armature for guiding the axial displacement of said armature,
   (g) said armature also having a circumferentially extending collar means comprising a radial protrusion,
   (h) said collar means comprising a first annular surface portion disposed to seat on and unseat from said first annular valve seat as said armature is axially displaced on said valve body structure by said solenoid coil,
   (i) said collar means also comprising a second annular surface portion disposed to seat on and unseat from said second annular valve seat as said armature is axially displaced on said valve body structure by said solenoid coil,
   (j) said pressure port, said control port, and said dump port being arranged in relation to said first and second annular valve seats, and said first and second annular surface portions of said collar means being arranged in relation to said first and second annular valve seats such that (i) when said first annular surface portion of said collar means is seated on said first annular valve seat, said second annular surface portion of said collar means is unseated from said second valve seat, and said control port is fluid communication with one of said pressure and dump ports but not with the other, and (ii) when said second annular surface portion of said collar means is seated on said second valve seat, said first annular surface portion of said collar means is unseated from said first valve seat, and said control port is in fluid communication with said other of said pressure and dump ports, but not with said one of said pressure and dump ports,
   (k) wherein the axial displacement of said armature is limited only by the respective seatings of said first and second annular surface portions of said collar means on said first and second valve seats respectively,
   (l) wherein said guide means of said valve body structure and said one surface portion of said armature are constructed to conjointly form a piston-type seal that seals directly between said pressure port and said dump port both when said first annular surface portion of said collar means is seated on said first valve seat and when said second annular surface portion of said collar means is seated on said second valve seat,
   (m) a stator comprising an annular surface portion closely coaxially confronting, but always axially spaced apart from, an annular surface portion of said armature to provide the direct electromagnetic coupling of said solenoid coil to said armature, and
   (n) means providing for perfusion of the space between said stator's and said armature's annular surface portions by hydraulic fluid and for the unhindered ingress and egress thereof to and from said space as said armature is operated by the modulation of said solenoid coil.

2. A valve as set forth in claim 1 including resilient means biasing said armature to resiliently urge said first annular surface portion of said collar means toward said first valve seat.

3. A valve as set forth in claim 1 wherein the interior of said tubular armature is communicated to said dump port so as to cause the pressure at said space to be approximately at the dump pressure.

4. A valve as set forth in claim 1 wherein the interior of said tubular armature is communicated to said pressure port so as to cause the pressure at said space to be approximately that at said pressure port.

5. A pulse width modulated three-way solenoid valve comprising valve body structure,
   (a) said valve body structure comprising a pressure port, a control port and a dump port serving to place the valve in a three-way fluid control circuit,
   (b) first and second annular valve seats spaced apart axially on said valve body structure,
   (c) a solenoid coil mounted on said valve body structure and adapted to be electrically modulated,
   (d) a tubular armature that is acted directly upon by an electromagnetic field issued by said solenoid coil in response to the electrical modulation thereof and that is axially displaced on said valve body structure in response to electrical modulation of said solenoid coil such that the respective fluid pressures at said pressure port and at said dump port are modulated to said control port in accordance with the electrical modulation of said solenoid coil,
   (e) said tubular armature comprising a radially outer surface portion and a radially inner surface portion,
   (f) said valve body structure comprising guide means confronting one of said surface portions of said armature for guiding the axial displacement of said armature,
   (g) said armature also having a circumferentially extending collar means comprising a radial protrusion,
   (h) said collar means comprising a first annular surface portion disposed to seat on and unseat from said first annular valve seat as said armature is axially displaced on said valve body structure by said solenoid coil,
   (i) said collar means also comprising a second annular surface portion disposed to seat on and unseat from said second annular valve seat as said armature is axially displaced on said valve body structure by said solenoid coil, (j) said pressure port, said control port, and said dump port being arranged in relation to said first and second annular valve seats, and said first and second annular surface portions of said collar means being arranged in relation to said first and second annular valve seats such that (i) when said first annular surface portion of said collar means is seated on said first annular valve seat, said second annular surface portion of said collar means is unseated from said second valve seat, and said control port is fluid communication with one of said pressure and dump ports but not with the other, and (ii) when said second annular surface portion of said collar means is seated on said second valve seat, said first annular surface portion of said collar means is unseated from said first valve seat, and said control port is in fluid communication with said other of said pressure and dump ports, but not with said one of said pressure and dump ports, (k) wherein the axial displacement of said armature is limited only by the respective seatings of said first and second annular surface portions of said collar means on said first and second valve seats respectively, (l) wherein said guide means of said valve body structure and said one surface portion of said armature are constructed to conjointly form a piston-type seal that seals directly between said pressure port and said dump port both when said first annular surface portion of said collar means is seated on said first valve seat and when said second annular surface portion of said collar means is seated on said second valve seat, and (m) wherein, when said solenoid coil is de-energized, a resilient means which acts on said armature biases said armature such that said first annular surface portion of said collar means is caused to seat on said first annular valve seat, and when said solenoid coil is energized, said armature is axially displaced against the bias of said resilient means to cause said second annular surface portion of said collar means to seat on said second annular valve seat, and (n) wherein, when said first annular surface portion of said collar means is seated on said first annular valve seat, said control port is in fluid communication with said dump port and not with said pressure port, and when said second annular surface portion of said collar means is seated on said second annular valve seat, said control port is in fluid communication with said pressure port and not with said dump port.

6. A valve as claimed in claim 5 including (o) a stator comprising an annular surface portion closely coaxially confronting, but always axially spaced apart from, an annular surface portion of said armature to provide the direct electromagnetic coupling of said solenoid coil to said armature, and (p) means providing for perfusion of the space between said stator's and said armature's annular surface portions by hydraulic fluid and for the unhindered ingress and egress thereof to and from said space as said armature is operated by the modulation of said solenoid coil.

7. A valve as set forth in claim 6 wherein (q) said resilient means is disposed radially adjacent said space.

8. A pulse width modulated three-way solenoid valve comprising valve body structure, (a) said valve body structure comprising a pressure port, a control port and a dump port serving to place the valve in a three-way fluid control circuit, (b) first and second annular valve seats spaced apart axially on said valve body structure, (c) a solenoid coil mounted on said valve body structure and adapted to be electrically modulated, (d) a tubular armature that is acted directly upon by an electromagnetic field issued by said solenoid coil in response to the electrical modulation thereof and that is axially displaced on said valve body structure in response to electrical modulation of said solenoid coil such that the respective fluid pressures at said pressure port and at said dump port are modulated to said control port in accordance with the electrical modulation of said solenoid coil, (e) said tubular armature comprising a radially outer surface portion and a radially inner surface portion, (f) said valve body structure comprising guide means confronting one of said surface portions of said armature for guiding the axial displacement of said armature, (g) said armature also having a circumferentially extending collar means comprising a radial protrusion, (h) said collar means comprising a first annular surface portion disposed to seat on and unseat from said first annular valve seat as said armature is axially displaced on said valve body structure by said solenoid coil, (i) said collar means also comprising a second annular surface portion disposed to seat on and unseat from said second annular valve seat as said armature is axially displaced on said valve body structure by said solenoid coil, (j) said pressure port, said control port, and said dump port being arranged in relation to said first and second annular valve seats, and said first and second annular surface portions of said collar means being arranged in relation to said first and second annular valve seats such that (i) when said first annular surface portion of said collar means is seated on said first annular valve seat, said second annular surface portion of said collar means is unseated from said second valve seat, and said control port is fluid communication with one of said pressure and dump ports but not with the other, and (ii) when said second annular surface portion of said collar means is seated on said second valve seat, said first annular surface portion of said collar means is unseated from said first valve seat, and said control port is in fluid communication with said other of said pressure and dump ports, but not with said one of said pressure and dump ports, (k) wherein the axial displacement of said armature is limited only by the respective seatings of said first and second annular surface portions of said collar means on said first and second valve seats respectively, (l) wherein said guide means of said valve body structure and said one surface portion of said armature are constructed to conjointly form a piston-type seal that seals directly between said pressure port and said dump port both when said first annular surface portion of said collar means is seated on said first valve seat and when said second annular surface portion of said collar means is seated on said second valve seat, and (m) wherein said pressure port, said control port, and said dump port are disposed on said valve body structure such that they are located axially on said valve body structure to the same side of said solenoid coil.

9. A pulse width modulated three-way solenoid valve comprising valve body structure, (a) said valve body structure comprising a pressure port, a control port and a dump port serving to place the valve in a three-way fluid control circuit, (b) first and second annular valve seats spaced apart axially on said valve body structure, (c) a solenoid coil mounted on said valve body structure and adapted to be electrically modulated, (d) a tubular armature that is axially displaced on said valve body structure in response to electrical modulation of said solenoid coil such that the respective fluid pressures at said pressure port and at said dump port are modulated to said control port in accordance with the electrical modulation of said solenoid coil, (e) said tubular armature comprising a radially outer surface portion and a radially inner surface portion, (f) said valve body structure comprising guide means confronting one of said surface portions of said armature for guiding the axial displacement of said armature, (g) said armature comprising a first annular surface portion disposed to seat on and unseat from said first annular valve seat as said armature is axially displaced on said valve body structure by said solenoid coil, (h) said armature also comprising a second annular surface portion disposed to seat on and unseat from said second annular valve seat as said armature is axially displaced on said valve body structure by said solenoid coil, (i) said pressure port, said control port, and said dump port being arranged in relation to said first and second annular valve seats, and said first and second annular surface portions of said armature being arranged in relation to said first and second annular valve seats such that (i) when said first annular surface portion of said armature is seated on said first annular valve seat, said second annular surface portion of said armature is unseated from said second valve seat, and said control port is fluid communication with one of said pressure and dump ports but not with the other, and (ii) when said second annular surface portion of said armature is seated on said second valve seat, said first annular surface portion of said armature is unseated from said first valve seat, and said control port is in fluid communication with said other of said pressure and dump ports, but not with said one of said pressure and dump ports, (j) wherein the axial displacement of said armature is limited only by the respective seatings of said first and second annular surface portions of said armature on said first and second valve seats respectively, (k) wherein said guide means of said valve body structure and said one surface portion of said armature are constructed to conjointly form a piston-type seal that seals between said pressure port and said dump port, and (l) including in said valve body structure a passage that provides for the shunting of fluid from said pressure port directly to said piston-type seal, said passage containing a filter medium to filter contaminants from fluid passing therethrough.

* * * * *